US007610223B2

(12) United States Patent
Matsui et al.

(10) Patent No.: US 7,610,223 B2
(45) Date of Patent: Oct. 27, 2009

(54) SHEET METAL EQUIPMENT SALES METHOD AND SYSTEM THEREFOR

(75) Inventors: Yoshiyuki Matsui, Isehara (JP); Koichi Tsuchida, Isehara (JP); Kaoru Nakamura, Isehara (JP); Atsushi Kondo, Isehara (JP)

(73) Assignee: Amada Company, Limited, Kanagawa (JP)

( * ) Notice: Subject to any disclaimer, the term of this patent is extended or adjusted under 35 U.S.C. 154(b) by 1095 days.

(21) Appl. No.: 10/732,455

(22) Filed: Dec. 11, 2003

(65) Prior Publication Data

US 2004/0148230 A1 Jul. 29, 2004

(30) Foreign Application Priority Data

Nov. 27, 2003 (JP) ............................. 2003-396510

(51) Int. Cl.
G06F 17/30 (2006.01)
G06Q 30/00 (2006.01)

(52) U.S. Cl. .......................................... 705/27; 705/26
(58) Field of Classification Search .................... 705/27
See application file for complete search history.

(56) References Cited

U.S. PATENT DOCUMENTS 5,357,439 A * 10/1994 Matsuzaki et al. ............ 700/96
5,587,914 A * 12/1996 Conradson et al. ............ 700/95
5,642,291 A    6/1997 Prunotto et al.
6,058,397 A *  5/2000 Barrus et al. ............. 707/104.1
6,343,285 B1 * 1/2002 Tanaka et al. ................ 705/400
6,675,059 B2 * 1/2004 Scott ............................ 700/166
2003/0115108 A1 * 6/2003 Scott et al. ..................... 705/26

OTHER PUBLICATIONS

Concurrent Engineering. Stark, John, 1998. 3 pages, downloaded from http://www.johnstark.com/fwcce.html on Sep. 29, 2008.*
Honeycutt, Flaherty and Benassi, "Marketing Industrial Products on the Internet", Industrial Marketing Management, vol. 27, pp. 63-72, 1998.*

* cited by examiner

*Primary Examiner*—F. Zeender
*Assistant Examiner*—Paul Danneman
(74) *Attorney, Agent, or Firm*—Greenblum & Bernstein, P.L.C.

(57) ABSTRACT

A sheet metal equipment sales method includes the following steps of: prompting a user to access from an information terminal; receiving engineering drawing-related information relating to the user's product by a seller's computer, editing the engineering drawing-related information, searching a product the same as or similar to the user's product from a database, performing demonstrative working of the user's product by actual equipment to prepare demonstrative working information; and distributing one of the user's product fabrication information and the demonstrative working information.

11 Claims, 26 Drawing Sheets

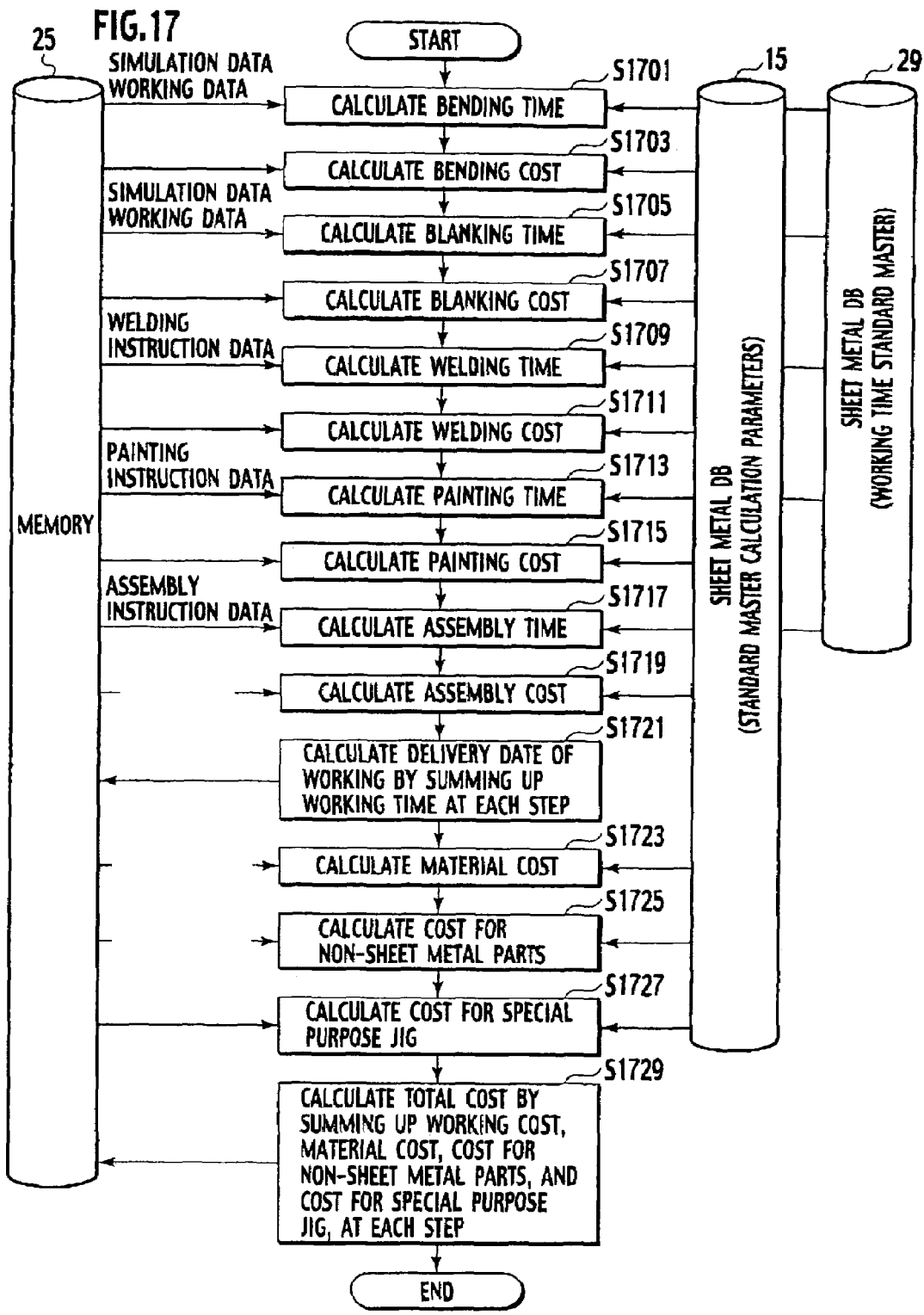

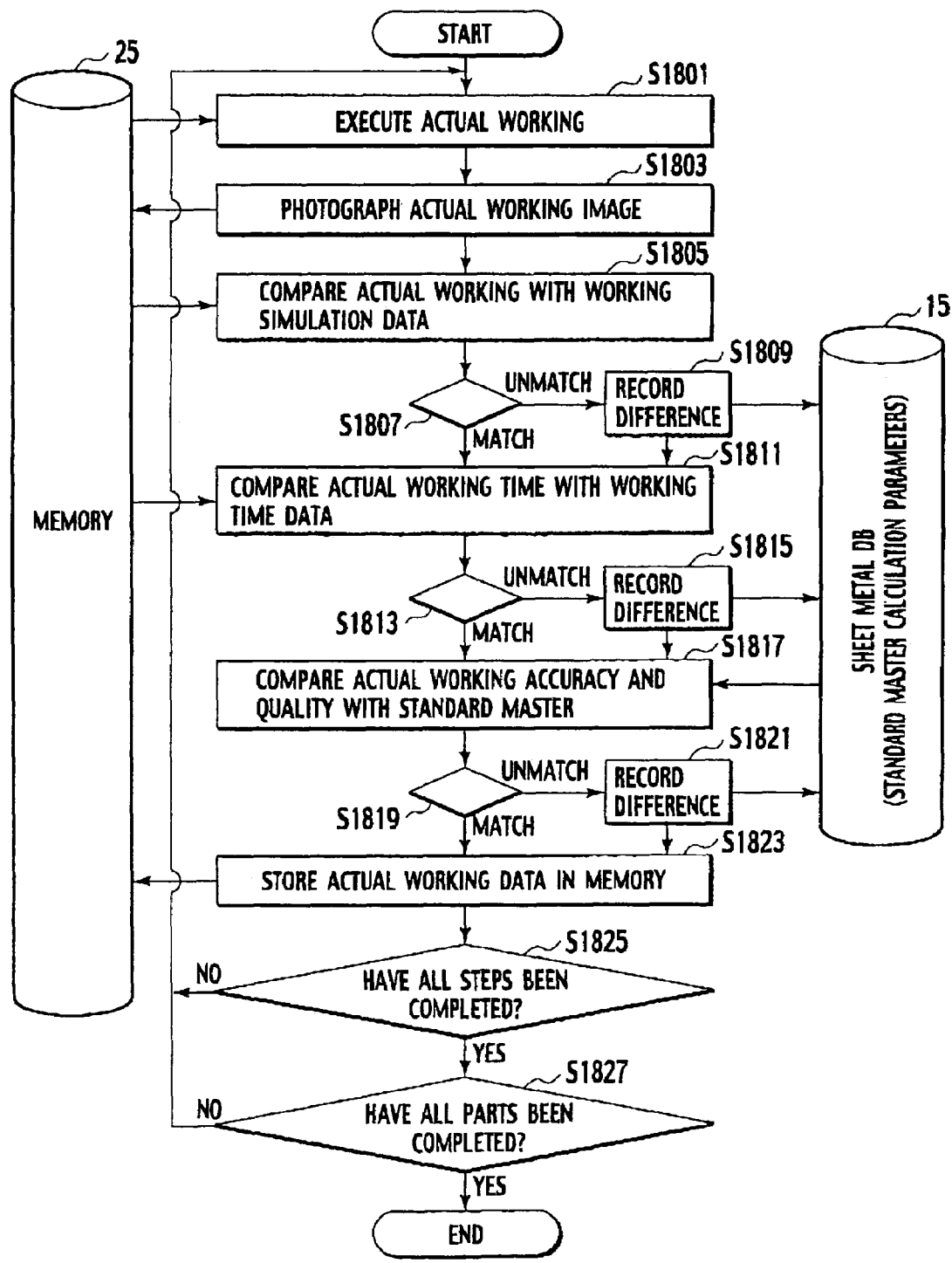

FIG.19A

WORKING DATA DIFFERENCE CHECK TABLE — TA

| NO | CHANGED ID | STEP | DIFFERENCE ||
|----|------------|------|---|---|
|    |            |      | SIMULATION WORKING DATA | ACTUAL WORKING DATA |
|    |            |      |  |  |

FIG.19B

WORKING CHANGE RECORDING TABLE — TB

| CHANGED ID | REASON OF CHANGE | CORRECTIVE ACTION |
|---|---|---|
|  |  |  |

FIG.19C

WORKING TIME CHECK TABLE — TC

| NO | STEP | MACHINE NAME | CALCULATED VALUE | ACTUAL MEASUREMENT | DIFFERENCE |
|---|---|---|---|---|---|
|  |  |  |  |  |  |

FIG.19D

WORKING ACCURACY CHECK TABLE — TD

| NO | MEASUREMENT POINT | STANDARD VALUE | TOLERANCE | MEASUREMENT | LEVEL DETERMINATION |
|---|---|---|---|---|---|
|  |  |  |  |  |  |
|  |  |  |  |  |  |
|  |  |  |  |  |  |

FIG.19E

STANDARD MASTER TABLE BY QUALITY ITEM — TE

| NO | QUALITY ITEM | STANDARD LEVEL | LINK INFORMATION TO IMAGE | EVALUATION POINT |
|---|---|---|---|---|
|  |  |  |  |  |
|  |  |  |  |  |

FIG.20A

H QUALITY ITEM LIST EXAMPLE

| NO | QUALITY ITEM | CONDITIONS |
|---|---|---|
|  | ROUGH SURFACE | MATERIAL/PLATE THICKNESS/V-WIDTH/BENDING ANGLE/BENDING TYPE |
|  | CRACK | MATERIAL/PLATE THICKNESS/V-WIDTH/BENDING ANGLE/BENDING TYPE/ DEVIATION QUANTITY |
|  | SECTION | MATERIAL/PLATE THICKNESS/CUTTING CONDITION |
|  | DROSS | MATERIAL/PLATE THICKNESS/CUTTING CONDITION |
|  | DEFECT | MATERIAL/PLATE THICKNESS/V-WIDTH/POINT R/BENDING ANGLE/ BENDING TYPE |
|  | R-BENDING SURFACE | MATERIAL/PLATE THICKNESS/BENDING R |
|  | BRUISE | MATERIAL/PLATE THICKNESS/STAMPED TONNAGE |
|  | BURR | MATERIAL/PLATE THICKNESS/CLEARANCE |
|  | NIBBLING SECTION | MATERIAL/PLATE THICKNESS/WORKING R/PUNCHING R/NIBBLING PITCH |
|  | RUPTURED SURFACE | MATERIAL/PLATE THICKNESS/CLEARANCE |
|  | DISCOLORATION | MATERIAL/PLATE THICKNESS/CUTTING CONDITION |
|  | DISCOLORATION | MATERIAL/PLATE THICKNESS/WELDING CONDITION |
|  | JUNCTION | MATERIAL/PLATE THICKNESS/WELDING CONDITION/GAP |

FIG.20B

EVALUATION CONDITION TABLE BY QUALITY ITEM — TF

| NO | CONDITIONS | STANDARD LEVEL |
|---|---|---|
|  |  |  |
|  |  |  |

FIG.20C

EVALUATION CONDITION TABLE BY QUALITY ITEM (ROUGH SURFACE) — TG

| NO | CONDITIONS ||||| STANDARD LEVEL |
|---|---|---|---|---|---|---|
|  | MATERIAL | PLATE THICKNESS | V-WIDTH | BENDING ANGLE | BENDING ANGLE |  |
|  |  |  |  |  |  |  |

FIG.20D

QUALITY CHECK TABLE — TH

| NO | CHECKPOINT | QUALITY ITEM | CONDITION NO. | VPS LEVEL | ACTUAL WORKING LEVEL |
|---|---|---|---|---|---|
|  |  |  |  |  |  |
|  |  |  |  |  |  |

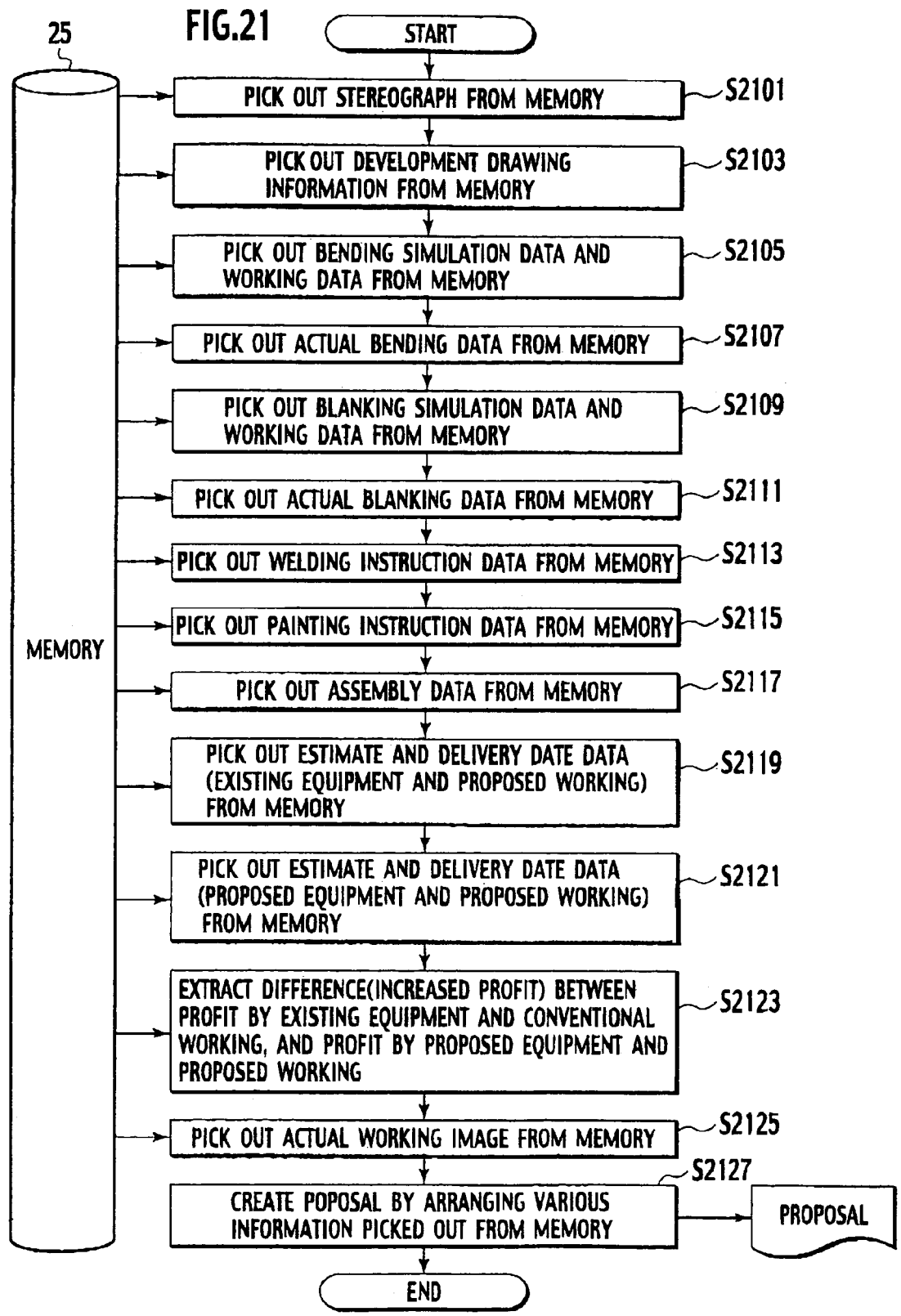

MATERIAL: SPCC
PLATE THICKNESS: 1.0 MILLIMETER

STEP 1

PUNCH NO. 21000
DIE NO. 41230
HOLDER NO. 8000

STEP 2

PUNCH NO. 21000
DIE NO. 41230
HOLDER NO. 8000

STEP 3

PUNCH NO. 21000
DIE NO. 41230
HOLDER NO. 8000

STEP 1

PUNCH NO. 21000
DIE NO. 41230
HOLDER NO. 8000

STEP 2

PUNCH NO. 402
DIE NO. 32300
HOLDER NO. 8000

STEP 3

PUNCH NO. 402
DIE NO. 32300
HOLDER NO. 8000

FIG.25A
TA WORKING DATA DIFFERENCE CHECK TABLE

| NO | CHANGED ID | STEP | DIFFERENCE VSP WORKING DATA | DIFFERENCE ACTUAL WORKING DATA |
|---|---|---|---|---|
| 1 | 1 | BENDING | PUNCH AT STEP 2 NO.21000 | PUNCH AT STEP 2 NO.402 |
| 2 | 1 | BENDING | DIE AT STEP 2 NO.41230 | DIE AT STEP 2 NO.32300 |
| 3 | 2 | BENDING | PUNCH AT STEP 3 NO.21000 | PUNCH AT STEP 3 NO.402 |
| 4 | 2 | BENDING | DIE AT STEP 2 NO.41230 | DIE AT STEP 3 NO.32300 |
| 5 | | | | |

TB WORKING CHANGE RECORDING TABLE

| CHANGED ID | REASON OF CHANGE | CORRECTIVE ACTION |
|---|---|---|
| 1 | TO IMPROVE INSUFFICIENT ACCURACY IN BENDING ANGLE | USE DIE HAVING THE SAME ANGLE WITH BENDING ANGLE |
| 2 | TO DECREASE ARRANGEMENT | USE THE SAME ARRANGEMENT AS THE PREVIOUS STEP |
| 3 | | |

FIG.25B
TC WORKING TIME CHECK TABLE

| NO | STEP | WORKING MACHINE | CALCULATED VALUE | ACTUAL MEASUREMENT | DIFFERENCE |
|---|---|---|---|---|---|
| 1 | BLANKING | A | 30sec | 35sec | 5sec |
| 2 | BLANKING | B | 20sec | 18sec | -2sec |
| 3 | BENDING | C | 60sec | 80sec | 20sec |

FIG.25C
TD WORKING ACCURACY CHECK TABLE

| NO | MEASUREMENT POINT | REFERENCE VALUE | TOLERANCE | MEASUREMENT | LEVEL DETERMINATION |
|---|---|---|---|---|---|
| 1 | FLANGE | 50 | +/-0.2 | 50.1 | A |
| 2 | ANGLE | 90° | +/-30' | 89° 40' | B |
| 3 | | | | | |

FIG.26

TG QUALITY CHECK TABLE

| NO | CHECKPOINT | QUALITY ITEM | CONDITION NO. | VPS LEVEL | ACTUAL WORKING LEVEL |
|---|---|---|---|---|---|
| 1 | BENDING R-3 | R-BENDING SURFACE | 1 | A | |
| 2 | NOTCH R-1 | NIBBLING SECTION | 2 | A | |
| 3 | EDGE-1 | BURR | 1 | A | |
| 4 | | | | | |

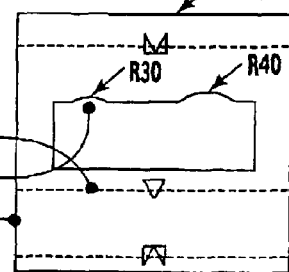

TF

| NO | BURR EVALUATION-CONDITION | | | STANDARD LEVEL |
|---|---|---|---|---|
| | MATERIAL | PLATE THICKNESS | CLEARANCE | |
| 1 | SPCC | 1.0 | 0.1 | A |
| 2 | SUS | 1.0 | 0.2 | B |

TF

| NO | NIBBLING SECTION EVALUATION-CONDITION | | | | | STANDARD LEVEL |
|---|---|---|---|---|---|---|
| | MATERIAL | PLATE THICKNESS | R | PUNCH DIAMETER | PITCH | |
| 1 | SPCC | 1.0 | 30 | 10 | 2 | B |
| 2 | SPCC | 1.0 | 30 | 2 | 1 | A |
| | | | | | | |

TF

| NO | R-BENDING SURFACE EVALUATION-CONDITION | | | STANDARD LEVEL |
|---|---|---|---|---|
| | MATERIAL | PLATE THICKNESS | R | |
| 1 | SPCC | 1.0 | 30 | A |
| 2 | SPCC | 2.0 | 20 | A |

GA: R-BENDING SURFACE EXCELLENT .gif, R-BENDING SURFACE NORMAL .gif, R-BENDING SURFACE ROUGH .gif GB: NIBBLING SECTION EXCELLENT .gif, NIBBLING SECTION NORMAL .gif GC: BURR EXCELLENT .gif, BURR NORMAL .gif

TE STANDARD MASTER TABLE BY QUALITY ITEM

| NO | QUALITY ITEM | STANDARD LEVEL | LINK INFORMATION TO IMAGE | EVALUATION POINT |
|---|---|---|---|---|
| 1 | R-BENDING SURFACE | A | R-BENDING SURFACE EXCELLENT .gif | SMOOTHNESS |
| 2 | R-BENDING SURFACE | B | R-BENDING SURFACE NORMAL .gif | SMOOTHNESS |
| 3 | R-BENDING SURFACE | C | R-BENDING SURFACE ROUGH .gif | SMOOTHNESS |
| 4 | NIBBLING SECTION | A | NIBBLING SECTION EXCELLENT .gif | SMOOTHNESS |
| 5 | NIBBLING SECTION | B | NIBBLING SECTION NORMAL .gif | SMOOTHNESS |
| 6 | BURR | A | BURR EXCELLENT .gif | TOUCH |
| 7 | BURR | B | BURR NORMAL .gif | TOUCH |
| 8 | | | | |

SHEET METAL EQUIPMENT SALES METHOD AND SYSTEM THEREFOR

BACKGROUND OF THE INVENTION

1. Field of the Invention

The present invention relates to a sheet metal equipment sales method and a system therefor. More specifically, the present invention relates to a sheet metal equipment sales method and a system therefor, in which it is ensured that the virtual proposal information provided to a user is the same as the actual sheet metal workings and sales of sheet metal products is performed based on the proposal information.

2. Description of the Related Art

Generally, as a method of proposing sheet metal working tools such as laser beam machines, numerical control (hereinafter, "NC") turret punch presses, and bending machines, following procedures have been taken. That is, a seller such as a manufacturer of working machinery invites users to his exhibition site, so that the user actually sees the metal working machinery, confirms the effects of the working machinery, and thereafter, sales of the working machinery is proposed. On the other hand, virtual working is performed on computer graphics (hereinafter, "CG"), to propose and sell the working machinery.

Such a conventional sheet metal equipment sales method has problems as described below. That is, huge expenses are necessary for the seller such as a manufacturer of working machinery to invite many users. Moreover, even with the proposing method using the CG, since it shows how to use the metal working machinery targeting many users, the user cannot confirm the effects in his own product. Likewise, since it is not his product, the process to the final product cannot be confirmed.

In the case of sheet metal working (particularly, after a bending step), realization of virtual simulation of realistic sheet metal working is difficult, and it is necessary to actually make a bailment to perform trial working. This is because there is no product model having the bending attribute, a computer having sufficient capacity to display three-dimensionally is very expensive, and there is no software connecting the product model and the metal working.

SUMMARY OF THE INVENTION

The present invention has been achieved with such points In mind.

It therefore is an object of the present invention to provide a sheet metal equipment sales method and a system which support users for high productivity in the future, by providing to the users with information of products working, based upon information of products drawing in the users, referring to variable kinds of working information (standard master, reference master table, calculating parameter, etc.) which has been stored by the sellers.

To achieve the object, according to a first aspect of the present invention, there is provided a sheet metal equipment sales method in which a seller sells sheet metal equipment to a user based on an appropriate metal working proposal, using a computer network, including: a step for prompting the user to access from an information terminal; a step for receiving engineering drawing-related information relating to the user's product by a seller's computer, based on the access, and storing the information in a memory; a step for editing the engineering drawing-related information, to generate engineering drawing-related editing information, such as a three-dimensional (hereinafter, "3D") model of the product, development information, and attribute information; a step for searching a product the same as or similar to the user's product from a database, and reading registered product fabrication information associated with the same or similar product; a step for using the registered product fabrication information. and the engineering drawing-related editing information to prepare user's product fabrication information, which is the information relating to the appropriate production method of the user's product by appropriate production equipment, and storing the information in a memory; a step for performing demonstrative working of the user's product by actual equipment to prepare demonstrative working information, based upon the user's product fabrication information, when there is an instruction from the user; and a step for distributing one of the user's product fabrication information and the demonstrative working information, as the proposal information.

According to, a second aspect of the present invention, there is provided a sheet metal equipment sales system in which a seller sells sheet metal equipment to a user based on an appropriate metal working proposal, using a computer network, comprising: a unit to prompt the user to access from an information terminal; a unit to receive engineering drawing-related information relating to the user's product by a seller's computer, based on the access, and store the information in a memory; a unit to edit the engineering drawing-related information, to generate engineering drawing-related editing information, such as a 3D model of the product, development information, and attribute information; a unit to search a product the same as or similar to the user's product from a database, and read registered product fabrication information associated with the same or similar product; a unit to use the registered product fabrication information and the engineering drawing-related editing information to prepare user's product fabrication information, which is the information relating to the appropriate production method of the user's product by appropriate production equipment, and store the information in a memory; a unit to perform demonstrative working of the user's product by actual equipment to prepare demonstrative working information, when there is an instruction from the user; and a unit to distribute the prepared information of the user's product fabrication information and the demonstrative working information, as the proposal information.

According to a third aspect of the present invention, there is provided a sheet metal working information proposing method in which a seller proposes appropriate sheet metal working information to a user, using a computer network, comprising: a step for prompting the user to access from an information terminal; a step at which a seller's computer held by the seller receives engineering drawing-related information relating to the user's product and product fabrication information A prepared by the user, and the user stores the information in a memory; a step for searching a product the same as or similar to the user's product from database, and reading registered product fabrication information associated with the same or similar product; a step for using the registered product fabrication information and the engineering drawing-related editing information obtained by editing the engineering drawing-related information to prepare user's product fabrication information B by appropriate production equipment, and storing the information in the memory; and a step for proposing a difference between the user product fabrication information B and the product fabrication information A prepared by the user obtained by comparison.

According to a fourth aspect of the present invention, there is provided a sheet metal working in formation proposing system in which a seller proposes appropriate sheet metal working information to a user, using a computer network, comprising: a unit to prompt the user to access from an information terminal; a unit by which a seller's computer held by the seller receives engineering drawing-related information relating to the user's product and product fabrication information A prepared by the user based on the access, and the user stores the information in a memory; a unit to search a product the same as or similar to the user's product from database, and read registered product fabrication information associated with the same or similar product; a unit to use the registered product fabrication information and the engineering drawing-related editing information obtained by editing the engineering drawing-related information to prepare user's product fabrication information B by appropriate production equipment, and store the information in a memory; and a unit to propose a difference between the user product fabrication information B and the product fabrication information A prepared by the user obtained by comparison.

As described above, according to the present invention, the user can verify the working result of his product even from a remote area, thereby enabling effective utilization of time. Moreover, since it is a sheet metal working proposal with demonstrative working, the user can judge the working process and the working result of the product without performing actual working and information for the decision making such as equipment modification can be obtained within a short period of time. Furthermore, there is an effect that reliability is improved, since a cause of a difference between the demonstrative working and the virtual working is accumulated.

Furthermore, since a difference (different amount) between a working method in the existing equipment held by the user and another working method in the proposed equipment proposed by the seller is proposed, the user may plan to install an appropriate and adaptive production equipment.

The seller can issue the working proposal globally at one place, and can execute a sales method, which is not accompanied by the actual object (workpiece), with the sales cost of the product reduced. Moreover, the proposer can make a proposition for a profit increase close to the actual state of the user's factory.

On the other hand, when the user suddenly changes the request, re-simulation is possible, and hence there is the effect to the user that choices for the equipment to be purchased are expanded. The cost for actual trial working is reduced, and an installation site for performing the trial working, the installation cost and training therefor are not necessary.

BRIEF DESCRIPTION OF THE ACCOMPANYING DRAWINGS

The above and further objects and novel features of the present invention will more fully appear from the following detailed description when the same is read in conjunction with the accompanying drawings.

FIG. 6 is a diagram for explaining calculation of an estimate, delivery time and the like.

FIG. 17 is a flowchart showing calculation of working time and working cost of a product.

FIG. 18 is a flowchart showing the operation for demonstrative working.

FIGS. 19A to 19E are diagrams for explaining respective tables.

FIGS. 20A to 20D are diagrams for explaining respective tables.

FIG. 21 is a flowchart showing the operation for creating proposal information.

FIGS. 25A to 25C are diagrams for explaining examples of use of the respective tables.

FIG. 26 is a diagram for explaining an example of use of the table.

DETAILED DESCRIPTION OF THE PREFERRED EMBODIMENTS

Figure 1:
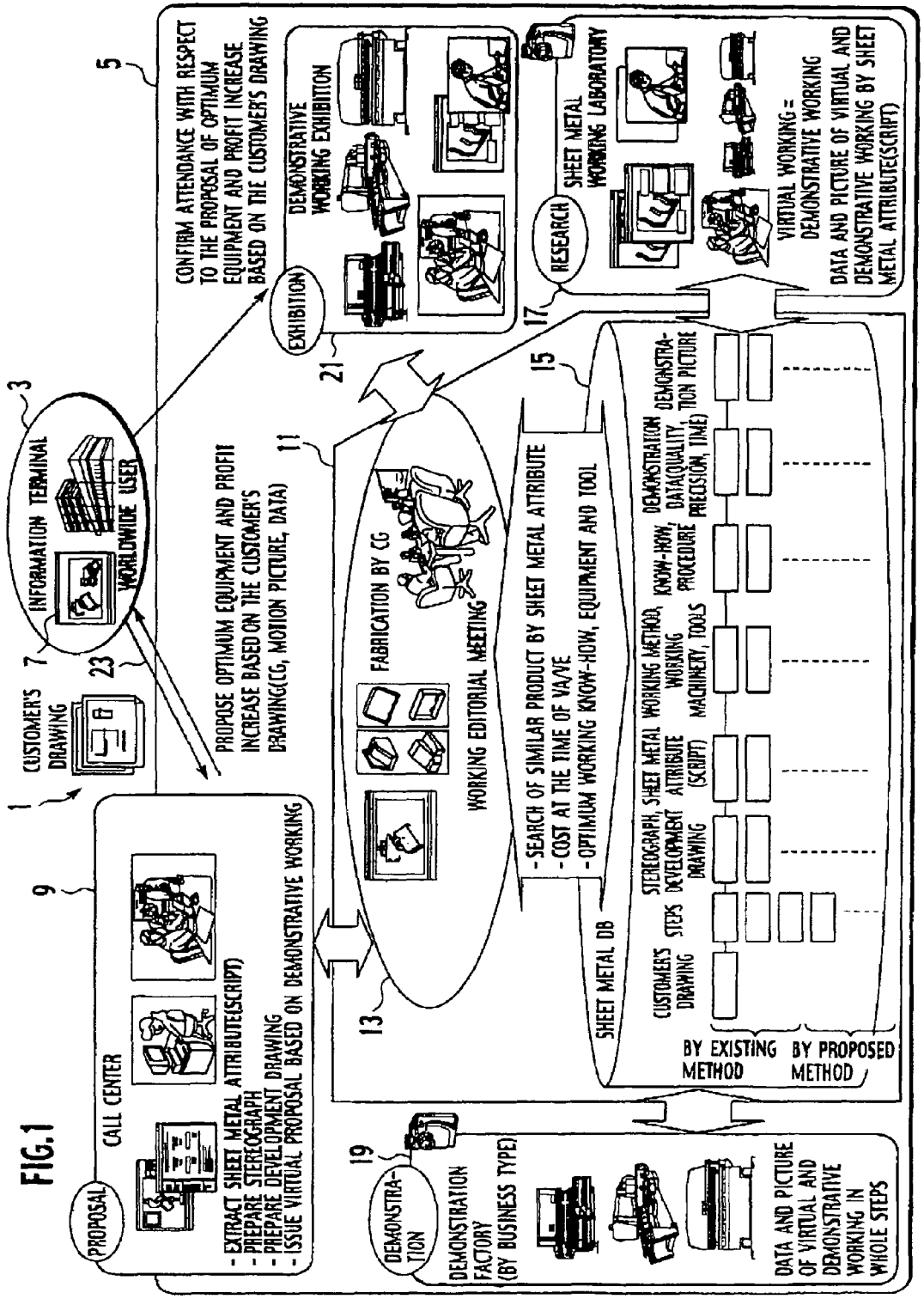
FIG. 1 is a schematic diagram for explaining the outline of a sheet metal equipment sales system.

Embodiments of the present invention will be described, with reference to the drawings. A block diagram of a sheet metal equipment sales system 1 according to the embodiment is shown in FIG. 1.

The sheet metal equipment sales system 1 includes a user 3 who has sheet metal equipment (the sheet metal equipment includes: a laser beam machine, an NC turret punch press, a bending machine, a punch, a dies software, a jig and so on) in his factory to perform sheet metal working, and a seller 5 who sells the sheet metal equipment to the user 3, based on an optimum proposal for sheet metal working. The user 3 and to the seller 5 can communicate with each other through a network 23 (for example, a dedicated line or the Internet). The user 3 has an information terminal 7 for obtaining the information for the sheet metal equipment and a response with respect to a query.

The seller 5 has a call center 9 for responding to the query of the user 3 and supporting the general sheet metal working, a seller's computer 11, a sheet metal working laboratory 17 in which processing for making the virtual working identical with the demonstrative working is performed, a demonstration factory 19 in which actual working is performed for a product and photographs are taken, and a demonstrative working exhibition hall 21 in which the user 3 can see the actual working.

The proposer's computer 11 includes an editing section 13 and a sheet metal database (database) 15. A computer system in which a plurality of computers capable of communicating with each other through the network is installed in a plurality of places is assumed here as the proposer's computer 11.

The editing section 13 edits the engineering drawing-related information (such as paper drawing, computer aided design (hereinafter "CAD") data, 3D model), to generate engineering drawing-related editing information, such as the 3D model of the product, development information, and attribute information. The editing section 13 searches a product the same as or similar to the user's product from the sheet metal database 15, reads registered product fabrication information associated with the same or similar product, and uses the registered product fabrication information and the engineering drawing-related editing information to prepare user's product fabrication information, which is the information relating to the appropriate production method of the user's product by appropriate production equipment. Moreover, the editing section 13 performs demonstrative working of the user's product by actual equipment to prepare demonstrative working information, when there is an instruction from the user.

The sheet metal database 15 stores information (registered product fabrication information) in which the product drawing, the fabrication process of the product, the 3D model, the development drawing, the sheet metal attribute (script), the working method, the working tool, the know-how, the procedure, the demonstration data (such as quality, precision, and time), demonstration pictures and the like are associated with each other.

Figure 2:
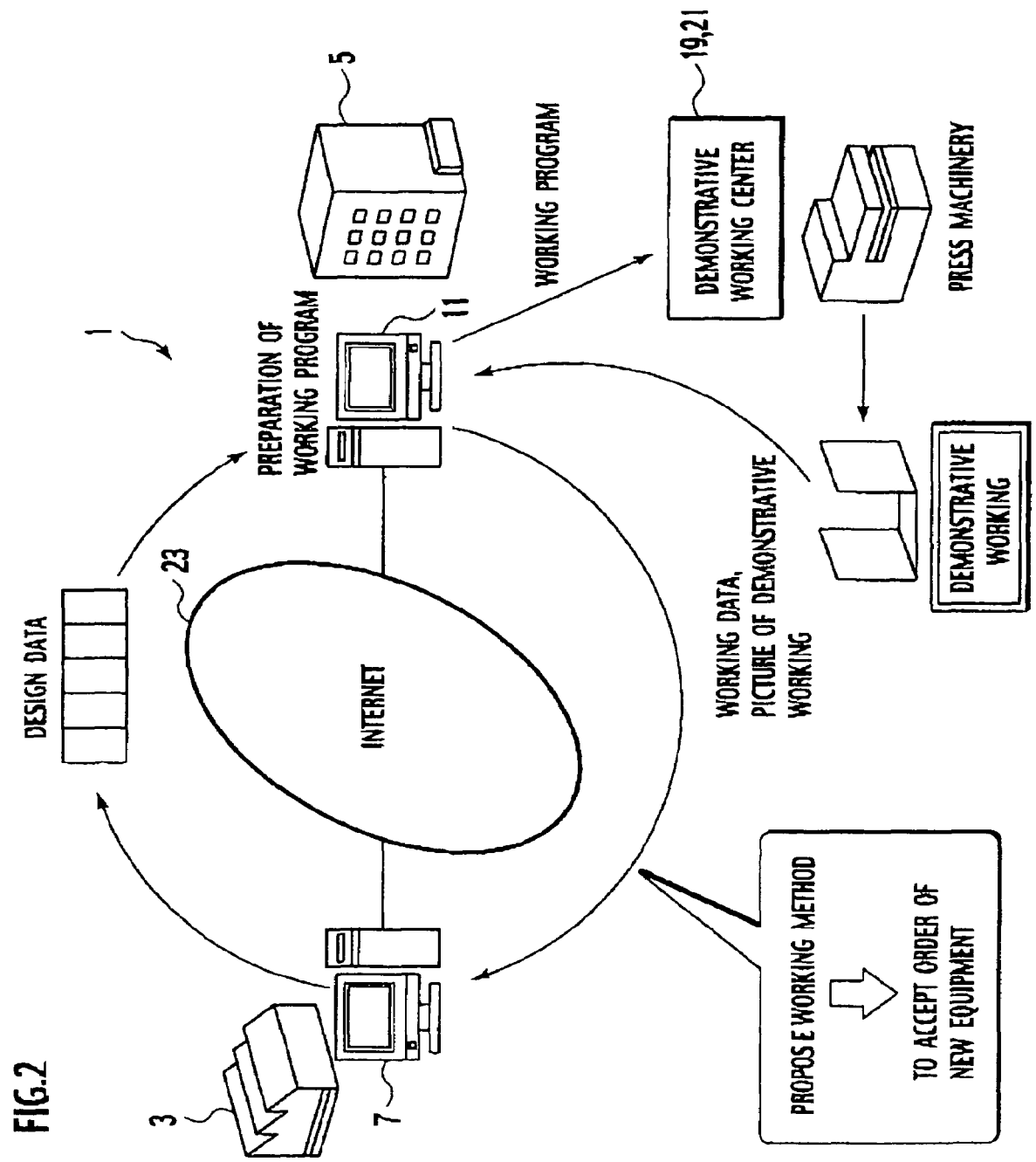
FIG. 2 is a diagram for explaining the general operation of the sheet metal equipment sales system.

The general flow in the sheet metal equipment sales system 1 is shown in FIG. 2. That is, the user 3 accesses the seller's computer 11 from the information terminal 7 to purchase the sheet metal equipment (for example, an NC turret punch press, a laser beam machine, or a bending machine). The user 3 then transmits the engineering drawing-related information, or design data of the own sheet metal product (such as paper drawing, CAD data, or 3D model of the product).

The seller's computer 11 receives the engineering drawing-related information and performs editing (for example, generation of a 3D model, development information and attribute information). When demonstrative working is required (for example, when there is a demand from the user 3 to see actual working, or when the same or similar product is not searched), the seller's computer 11 creates working data, and actual working is performed in the demonstrative working center (including 19, 21 and the like). This demonstrative working is converted into demonstrative working data, and then the demonstrative working data is transmitted to the information terminal 7 of the user 3 as proposal information. The user 3 then determines whether to purchase the sheet metal equipment, based on the proposal information.

Figure 3:
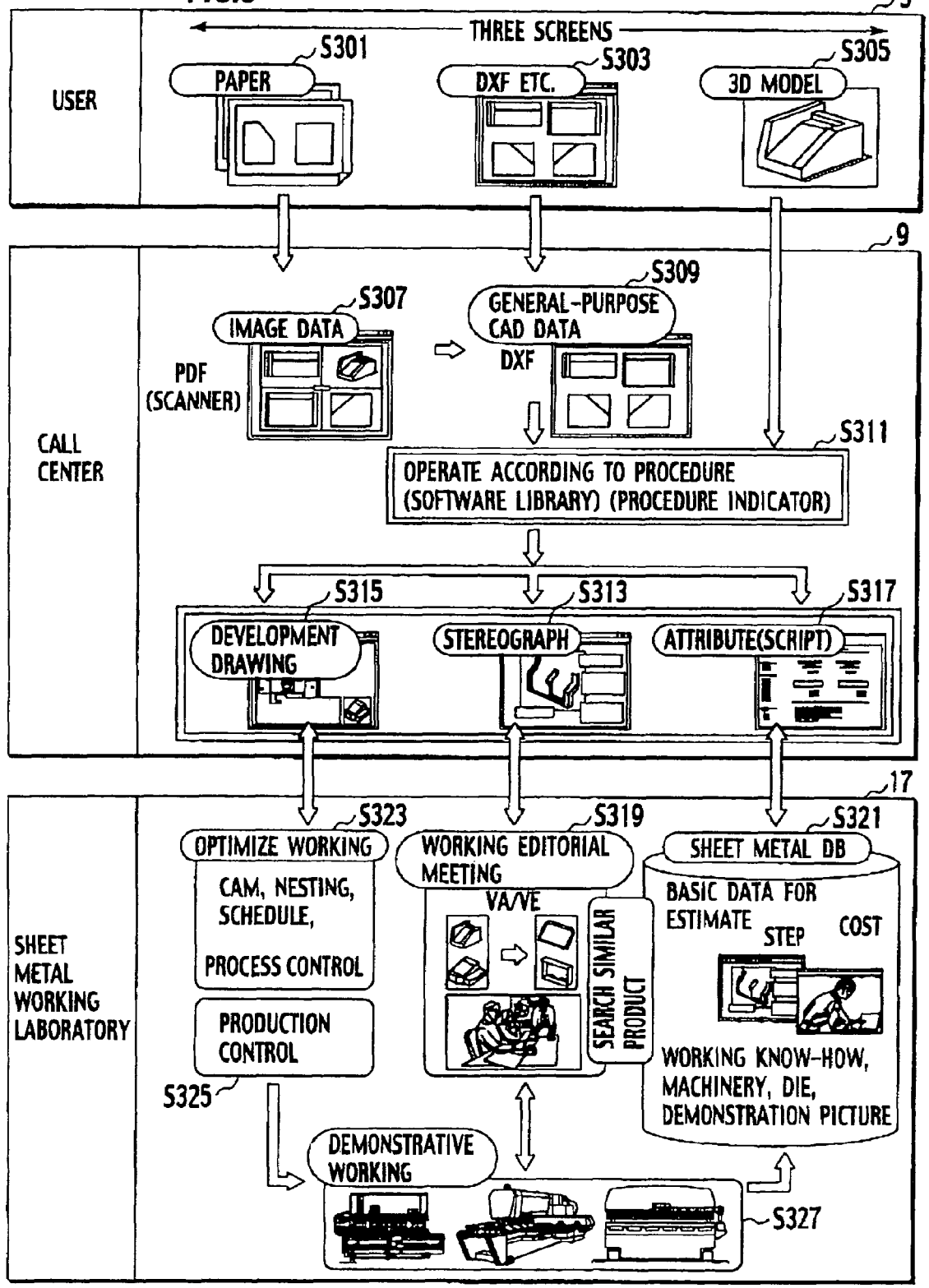
FIG. 3 is a diagram for explaining data processing in a call center and a sheet metal working laboratory.

Another explanation is given next with reference to FIG. 3, in which the processing flow of the respective data in the user 3, the call center 9, and the sheet metal working laboratory 17 is shown. Step S301 is for the case when the user 3 transmits the paper drawing (included in the engineering drawing-related information). Step S303 is for the case when the user 3 transmits the drawing in data by data exchanging format (hereinafter, "DXF") or the like (included in the engineering drawing-related information). Step S305 is for the case when the user transmits the 3D model (included in the engineering drawing-related information).

At step S307, when the received drawing is paper drawing, the drawing is read as image data by a scanner or the like. The drawing is traced by the CAD.

At step S309, when the received data is data such as DXF, the DXF data is converted to the CAD drawing data automatically.

At step S311, a stereograph (3D model) is prepared by an operation according to the procedure. At step S313, the stereograph (3D model) is completed. At step S315, the development information is prepared. At step S317, the attribute information of the sheet metal product is extracted, and stored in the sheet metal database (database) 15.

At step S319, the stereograph (3D model) is edited, and the stereograph (3D model) of the product is divided to study the working (when there is a value analysis/value engineering (hereinafter, "VA/VE") proposal or the like, it is prepared as the engineering drawing-related editing information).

At this time, a product the same as or similar to the product of the user 3 is searched in the sheet metal database (database) 15, to read the registered product fabrication information associated with the same or similar product. The registered product fabrication information and the engineering drawing-related editing information are then used to prepare the user's product fabrication information, or the information of the appropriate production method of the user's product by appropriate production equipment.

At step S321, the attribute information extracted from the product of the user 3 (for example, shape characteristics such as the bending length and fabrication) is registered in the sheet metal database (database) 15.

At step S323, when the demonstrative working is required (for example, when the user 3 wishes to see actual working directly, or when the same or similar product is not searched), the seller's computer 11 creates working data from the development information. At step S325, production control is performed. At step S327, demonstrative working is performed and demonstrative working information is prepared.

Subsequently, the proposal information including the user's product fabrication information and the demonstrative working information is transmitted to the user 3.

Figure 4:
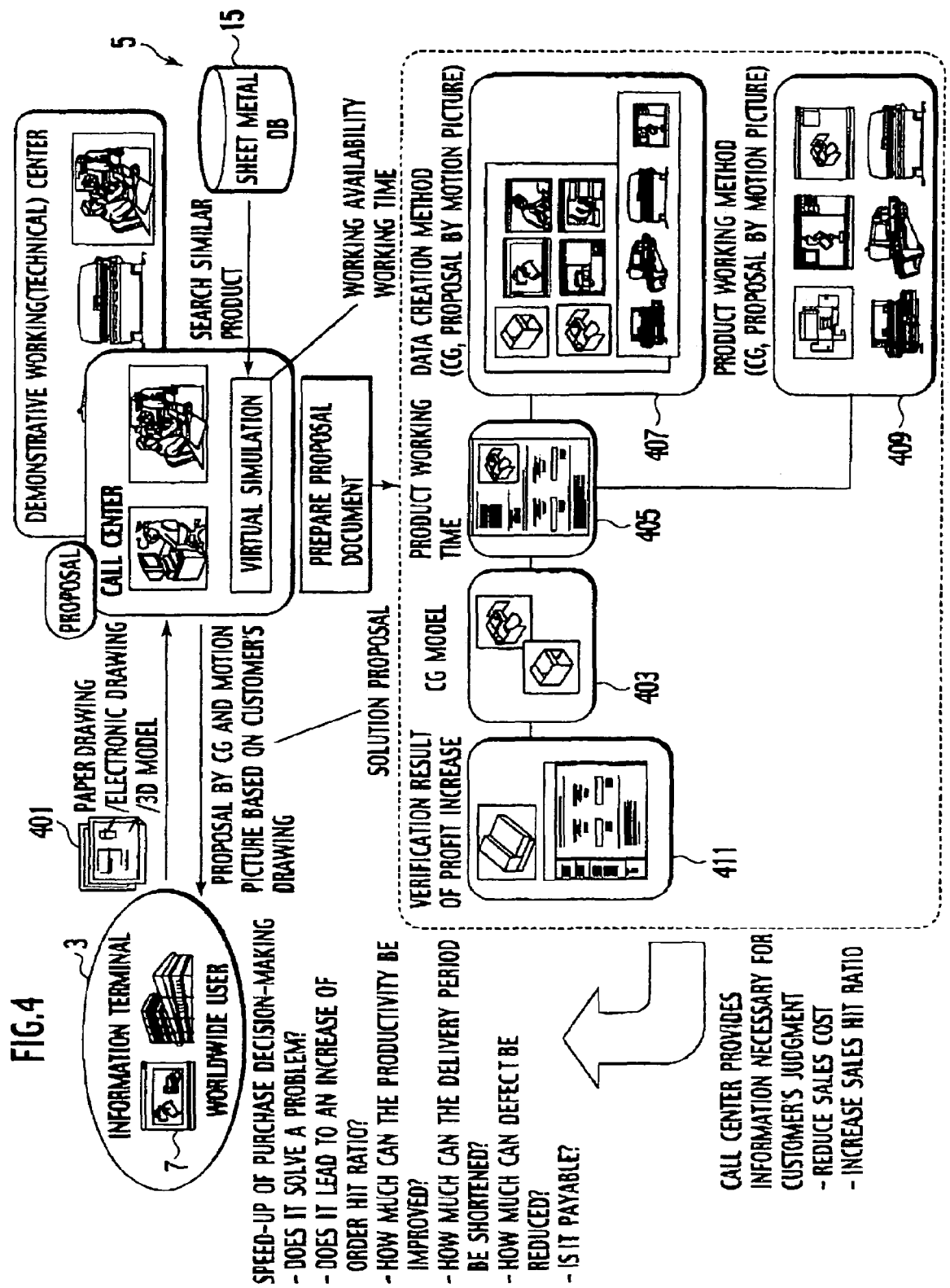
FIG. 4 is a diagram for explaining proposal information.

Another explanation is given next with reference to FIG. 4, in which details of the proposal information prepared based on the user's product fabrication information and the demonstrative working information are shown. That is, the seller 5 (including the call center 9, the demonstration factory 19, the sheet metal working laboratory 17, the demonstrative working exhibition hall 21) having received the engineering drawing-related information 401 (such as the paper drawing, CAD drawing, or 3D model) creates CG model data 403, estimation data and product working time data 405 (including delivery period), data creation method data 407 (NC data creation, decision for bending, CG such as CAD operation, and proposal by motion picture), product working method 409 (operation method of the working machinery, working know-how, CG of operation of the working machinery and the like, proposal by motion picture), and profit increase verification result data 411, and transmits these data to the user 3 as the proposal information. As a result, the user 3 can speed up the decision making for purchasing the sheet metal equipment.

Figure 5:
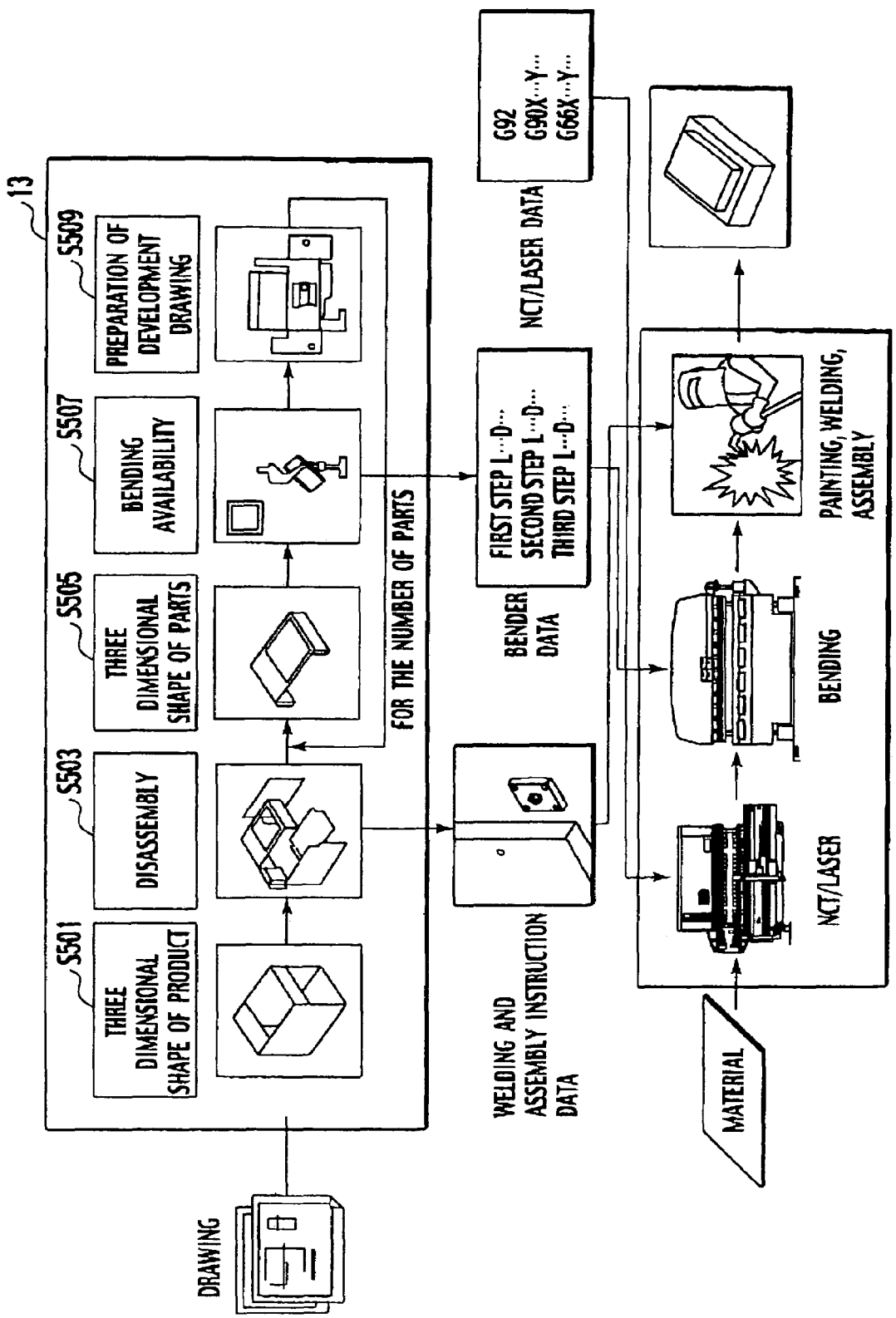
FIG. 5 is a diagram for explaining working simulation.

FIG. 5 indicates the processing operation by the editing section 13. That is, the editing section 13 reads the received CAD data. At step S501, the editing section 13 prepares a stereograph (3D model) of the product from trihedral figure data of the product stored in the editing section 13.

At step S503, the prepared stereograph (3D model) is divided into the stereographs (3D models) of the parts, taking bending and the like into consideration. At this time, the editing section 13 creates welding and assembly instruction data (for example, the assembly method is displayed by using the 3D model), and stored the data in the memory.

At step S505, the stereographs (3D models) of the parts divided at step S503 are displayed on a screen in order of processing.

At step S507, decision for bending is performed referring to the stereographs (3D models) of the parts displayed on the screen. The editing section 13 calculates an L value, which is a distance from back gauge to the position of a bending tool, and a D value, which is a dropping position of the bending tool, for each bending step, and stores these values in the memory. These L value and D value are calculated for each working step.

At step S509, the development drawing is prepared, referring to the stereographs (3D models) of the parts determined that bending is possible in the decision for bending. The editing section 13 creates NC data of the working machinery for cutting the developed parts from the sheet metal sheet by referring to the development drawing (thereby enabling virtual simulation of the operation of the working machinery). The processing from step S505 to step S509 is performed for each divided part. As a result, the virtual simulation (included in the engineering drawing-related editing information), by which the production method of the product can be virtually recognized on the screen, is completed.

Figure 6:
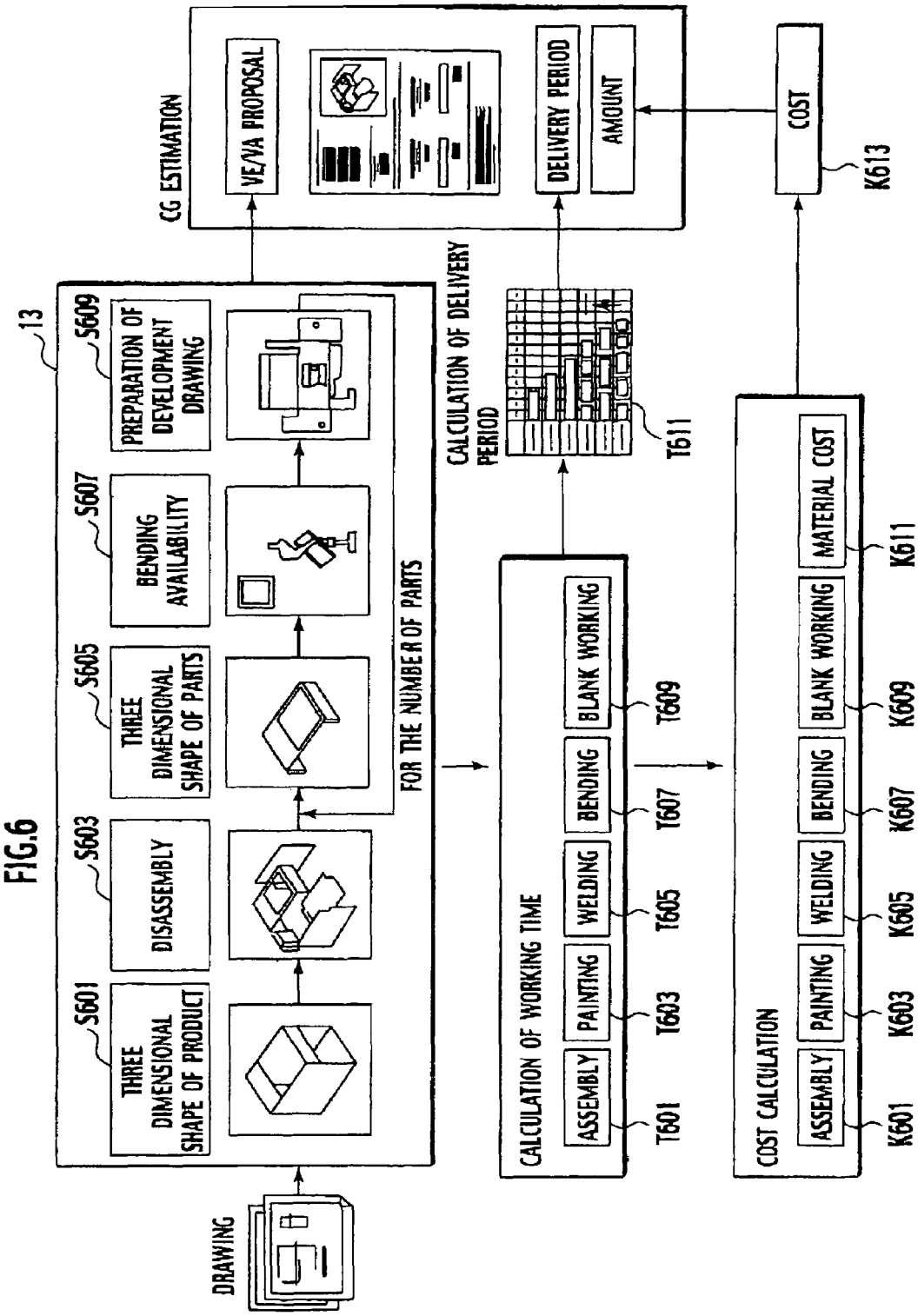

FIG. 6 illustrates the operation of calculation processing of the estimate and delivery period. That is, the editing section 13 reads the engineering drawing-related information (for example, the CAD data) from the memory. At step S601 the stereograph (3D model) of the product is prepared from the trihedral figure CAD data of the product in stored in the editing section 13.

At step S603, the prepared stereograph (3D-model) is divided into the stereographs (3D models) of the parts, taking bending and the like into consideration. At this time, assembly time T601, painting time T603, and welding time T605 are calculated and stored in the memory. Further, assembly cost K601, painting cost K603, and welding cost K605 are calculated, with reference to the respective times, and stored in the memory.

At step S605, the stereographs (3D models) of the parts divided at step S603 are displayed on the screen in order of processing.

At step S607, decision for bending is performed referring to the stereographs (3D models) of the parts displayed on the screen. The bending working time T607 is calculated here. Further, bending working cost K607 is calculated, with reference to the working time and the like.

At step S609, a development drawing is prepared, referring to the stereographs (3D models) of the parts determined in the decision for bending that bending is possible. Blank working time T609 is calculated, referring to this development drawing. Blank working cost K611 is then calculated, referring to the blank working time, the material cost and the like. The processing from step S605 to step S609 is performed for each divided part. As a result, calculation of the delivery period T611 can be performed. Moreover, the product cost K613 can be calculated by referring to the material cost K611. By putting these together, the CG estimate is prepared. When there is a VA/VE proposal or the like in the simulation, text data is created and stored in the memory. As a result, the user 3 can know in advance the time and cost for producing the sheet metal product, when purchasing the sheet metal equipment.

Figure 7:
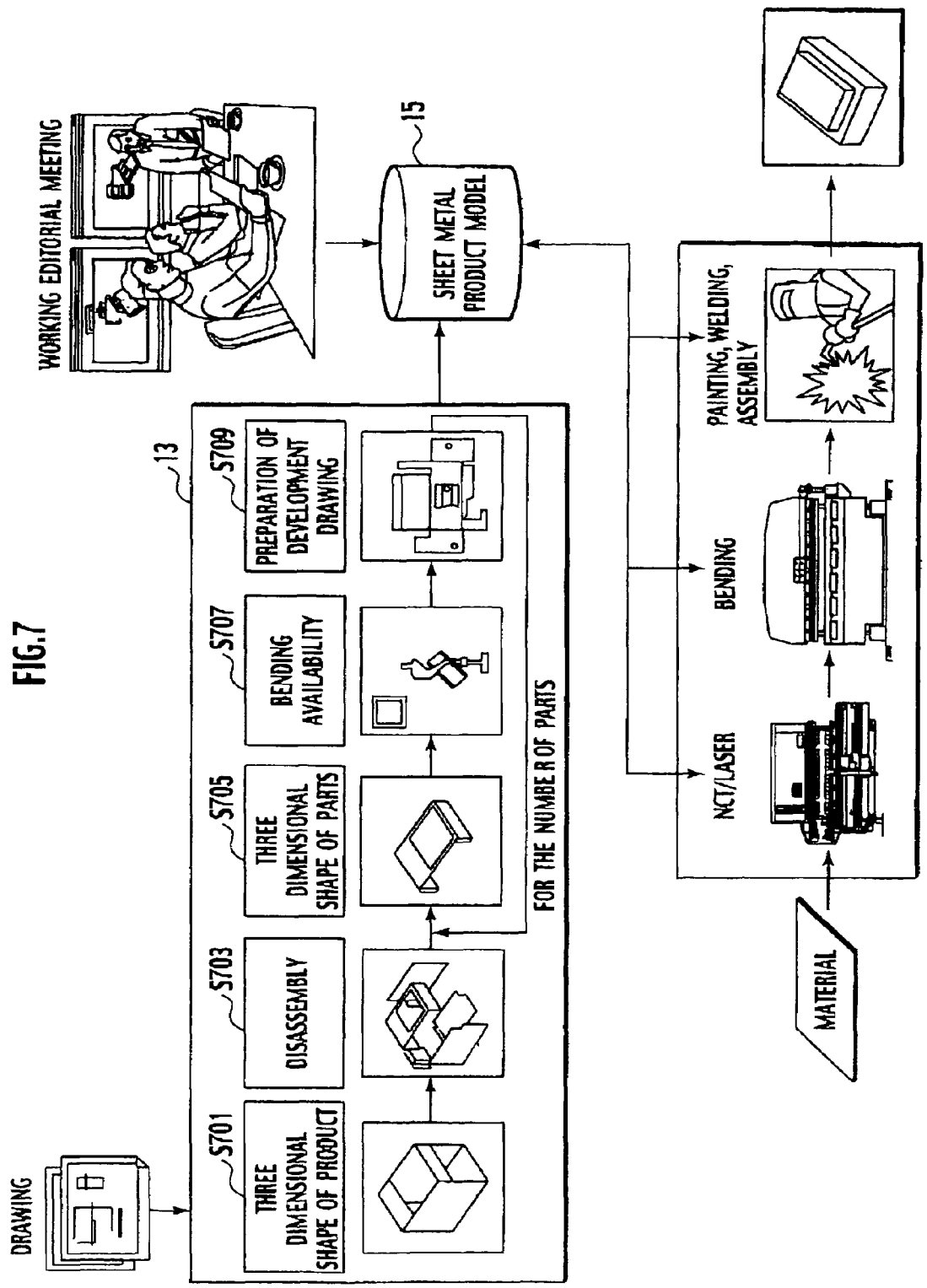
FIG. 7 is a diagram for explaining handing down of the technique.

FIG. 7 illustrates the processing operation of handing down the technique. Here, it is assumed a case in which the seller 5 logs in the information terminal 7 from the seller's computer 11, and a working editorial meeting is held between the seller 5 and the user 3 to determine the production method of the product, while studying sheet metal working based on the demonstration data of a similar workpiece and the working know-how from the sheet metal database (database) 15. In other words, the editing section 13 reads the engineering drawing-related information (for example, the CAD data) from the memory. At step S701, the stereograph (3D model) of the product is prepared from the trihedral figure of the product stored in the editing section 13. For example, the information terminal 7 is operated according to the instruction of the user 3. As a result, technique including the knowledge of a bending expert and an expert of the CAD/CAM technique can be handed down.

At step S703, the prepared stereograph (3D model) of the product is divided into the stereographs (3D models) of the parts, taking bending and the like into consideration. The user 3 and the seller 5 cooperate together.

At step S705, the stereographs (3D models) of the parts divided at step S703 are displayed on the screen in order of processing.

At step S707, decision for bending is carried out, using software and the stereographs (3D models) of the parts displayed on the screen, based on the sheet metal database 15.

At step S709, a development drawing is prepared automatically, based on the 3D models of the parts determined in the decision for bending that bending is possible.

The processing from step S705 to step S709 is performed for each divided part.

As a result, fabrication (working editorial meeting) on the computer is performed before the actual production, and the working method can be digitalized and shared. In other words, the techniques held by the user 3 and the seller 5 can be united and accumulated.

Figure 8:
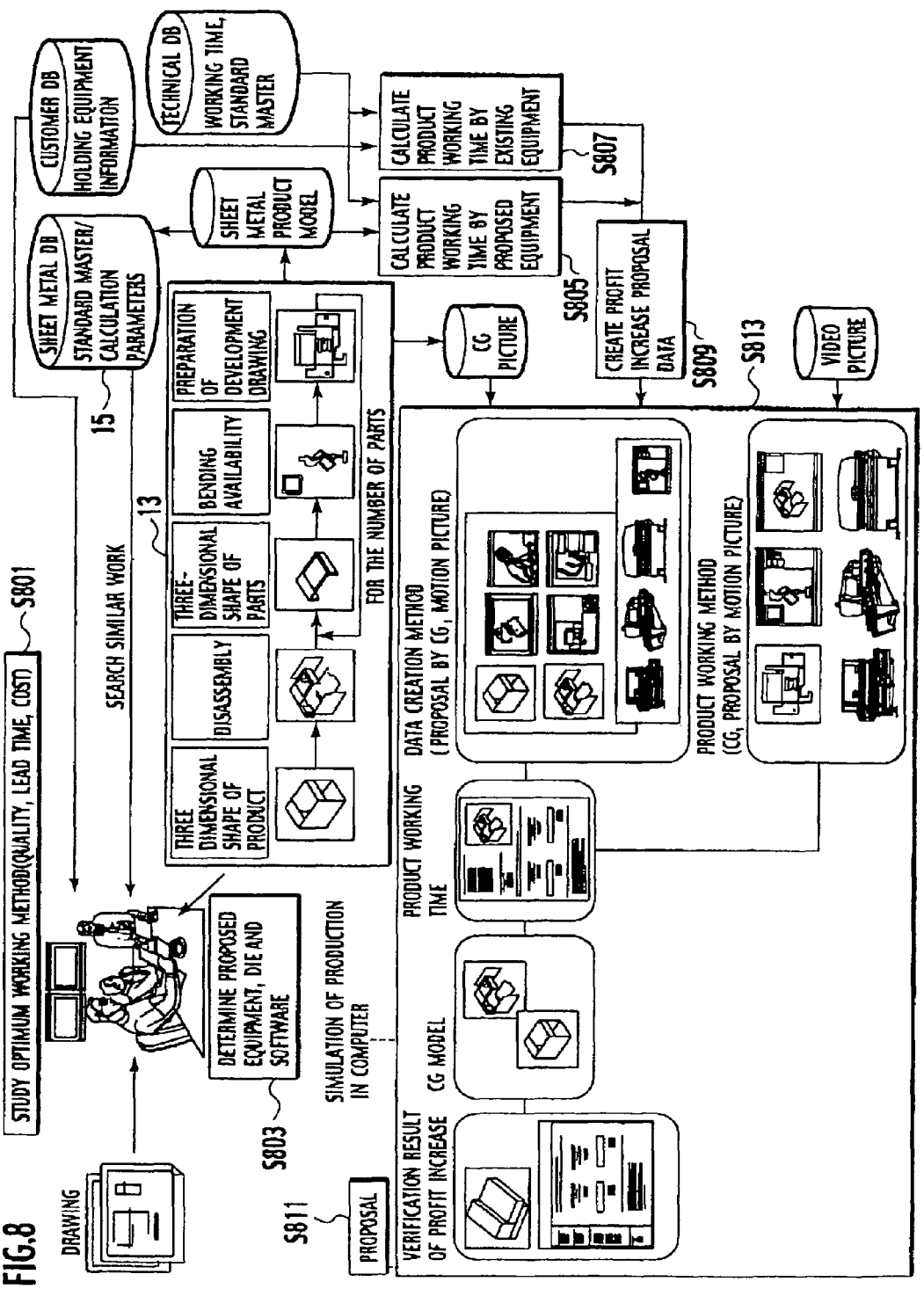
FIG. 8 is a diagram for explaining a virtual proposal.

Another explanation is given next with reference to FIG. 8, in which the operation for preparing the proposal information (particularly, for profit increase) based on the engineering drawing-related information received from the user 3 is illustrated.

At step S801, a similar workpiece is searched in the sheet metal database (database) 15. When there is a similar work, the proposal information is prepared by referring to this similar work. This similar workpiece may include demonstrative working in the past, and hence the reliability of each accompanying working information is high.

On the other hand, when any similar workpiece is not found, holding equipment information is read from the customer database, to prepare the stereograph (3D model), and perform disassembly, decision for bending, preparation of a development drawing and the like, thereby enabling working simulation with high fidelity with respect to the equipment held by the customer. Preparation of the stereograph (3D model), disassembly, decision for bending, preparation of a development drawing and demonstrative working are performed in the sheet metal working laboratory 17 and the demonstration factory 19, to study the optimum working method. As a result, comparison between working by the existing equipment and working by the proposed equipment can be accurately proposed.

At step S803, the proposed equipment, the die and the software are determined in the processing at step S801, and the result is stored in the memory.

At step S805, the product working time by the proposed equipment is calculated.

At step S807, the product working time by the existing equipment of the user 3 is calculated.

At step S809, profit increase proposal data is created by referring to the product working time by the proposed equipment and the product working time by the existing equipment of the user 3 (subtracting the product working time by the proposed equipment from the product working time by the existing equipment of the user 3).

At step S811, the editing section 13 prepares the proposal information 813, and transmits the information to the information terminal 7.

Figure 9:
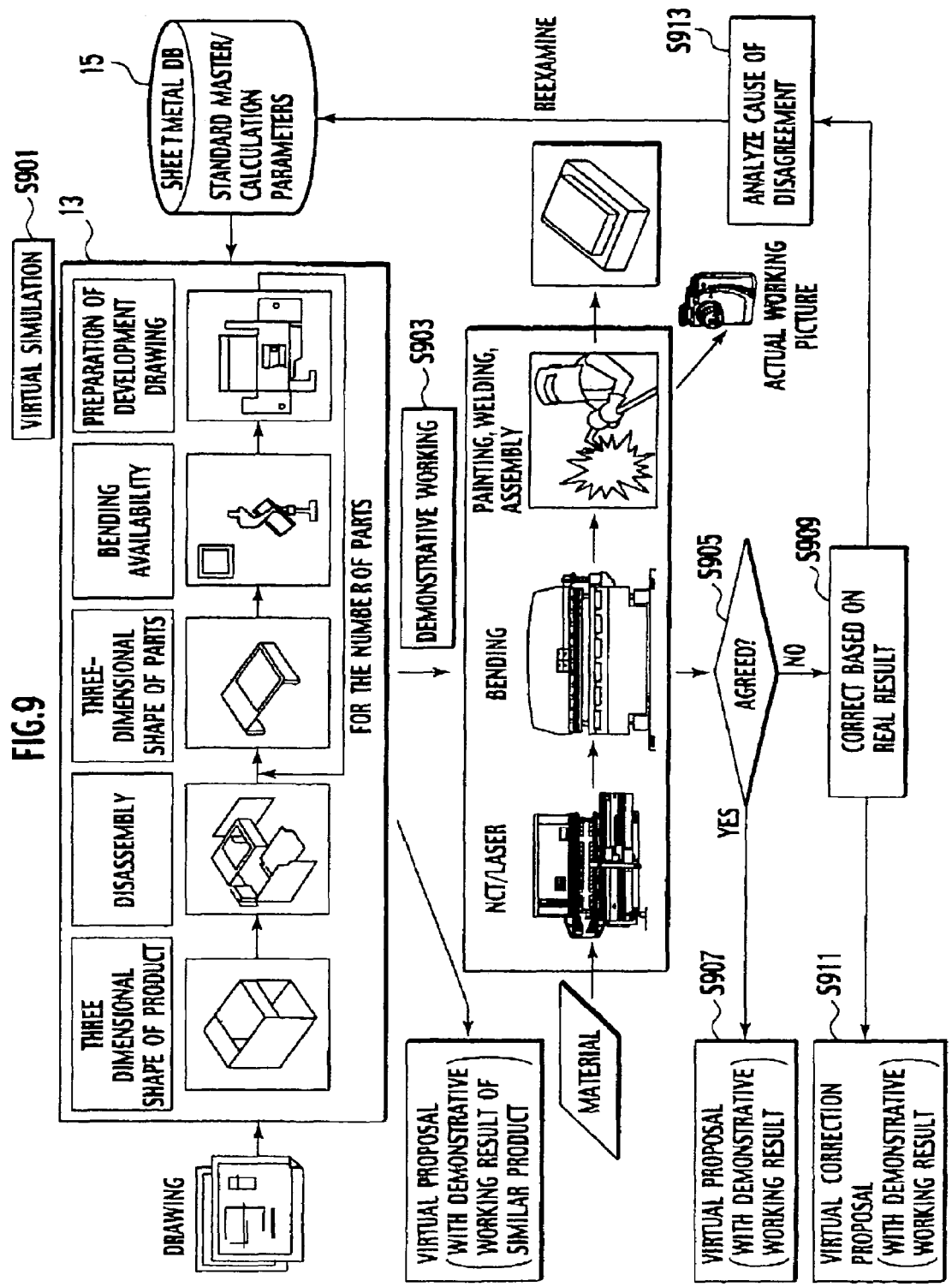
FIG. 9 is a diagram for explaining demonstration of the virtual proposal.

Reference to FIG. 9 is made, which indicates the flow of the demonstrative working. At step S901, the editing section 13 simulates the product working.

At step S903, demonstrative working agreeing with the simulation of the product working is performed. The demonstrative working is carried out in the demonstrative working center 301. The demonstrative working is photographed as the actual working picture, and the picture is stored in the memory.

At step S905, it is determined whether the result of the simulation of product working agrees with the result of the demonstrative working. If it is "Yes", control proceeds to step S907, and if it is not, control proceeds to step S909.

At step S907, the proposal information is prepared and virtual proposal is issued.

At step S909, the proposal information is corrected according to the real result based on the demonstrative working actually performed in the demonstrative working center 301. As a result, the result of working can be completely demonstrated.

At step S911, virtual correction is proposed. As a result, the user 3 can rely on the working result.

At step S913, the cause of disagreement between the virtual working and the demonstrative working is analyzed. By accumulating the causes of disagreement, and reflecting these on the working simulation, reliable proposal information can be prepared by the virtual simulation of the product working without performing the demonstrative working.

The accumulated data include the followings, that is, the standard master (disassembly standard, process design standard, assembly design standard, welding standard, bending and die standard, bending interference allowable level, laser beam machining cutting condition standard, punching and die allocation standard, working precision standard, and quality standard such as defect), and calculation parameters (working time and setup time for each machine, materials handling and transportation time, working time and planning time in human steps, an elongation value by material type and bending die, and the like).

Figure 10:
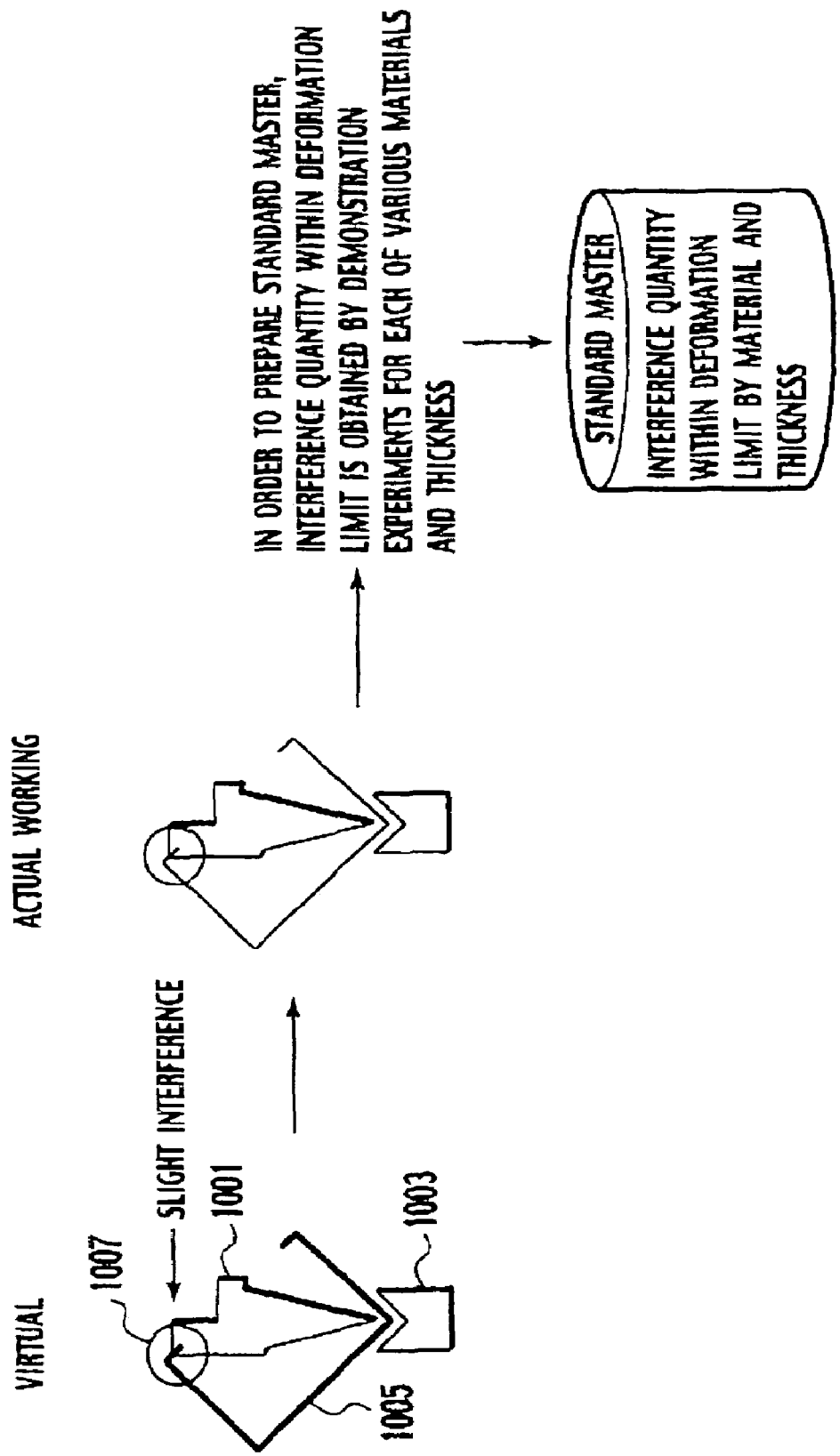
FIG. 10 is a diagram for explaining a specific example of working demonstration.

FIG. 10 illustrates a case in which. the simulation of the product working shown in FIG. 9 agrees with the actual working. In other words, there is a worry about an interference between the die and the parts, according to the D value taking spring back by the material into consideration, but it is judged as a result of the demonstrative working that the interference does not affect the product. As a result of reflecting this result on the sheet metal database 15 and accumulating the result in the database 15, it can be judged that at the time of bending a virtual part 1005 by using a virtual punching die 1001 and a virtual die 1003 by simulation, a virtual end of the virtual part 1005 interferes with the virtual punching die 1001, but the interference does not affect the product.

The outline of the sheet metal equipment sales system 1 has been explained above. The detailed explanation thereof is given below. Control and creation of the engineering drawing-related information, the engineering drawing-related editing information, and the registered product fabrication information can be distributed to and executed by a computer equipped in the call center 9, the sheet metal working laboratory 17 and the like. However, in the explanation below, it is assumed that the editing section 13 included in the seller's computer 11 performs each processing in a centralized manner, via the network.

Figure 11:
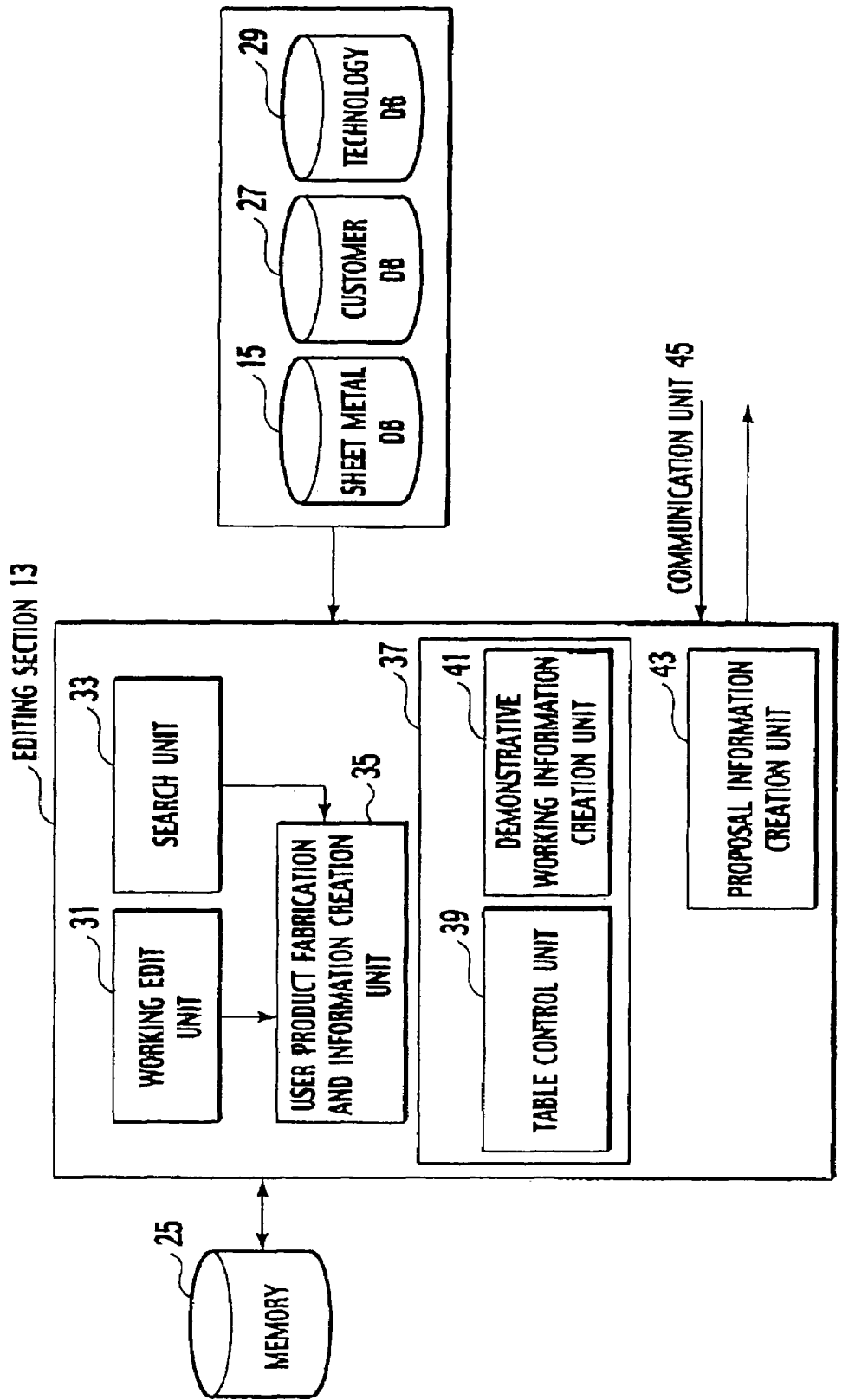
FIG. 11 is a diagram for explaining the outline of an editing section.

In other words, as shown in FIG. 11, the editing section 13 comprises a working edit unit 31, a search unit 33, a user product fabrication and an information creation unit 35, a demonstrative unit 37, a proposal information creation unit 43, and a communication unit 45.

The working edit unit 31 performs various kinds of edit processing for working the product. The search unit 33 performs processing for searching a product the same as or similar to the product. The demonstrative unit 37 performs actual working for the product, to obtain various types of information. The proposal information creation unit 43 creates information for making a proposal to the user. The communication unit 45 performs transfer of the various types of information.

The demonstrative unit 37 comprises a table control unit 39 for controlling respective tables, and a demonstrative working information creation unit 41 for creating predetermined information by performing demonstrative working.

Figure 12:
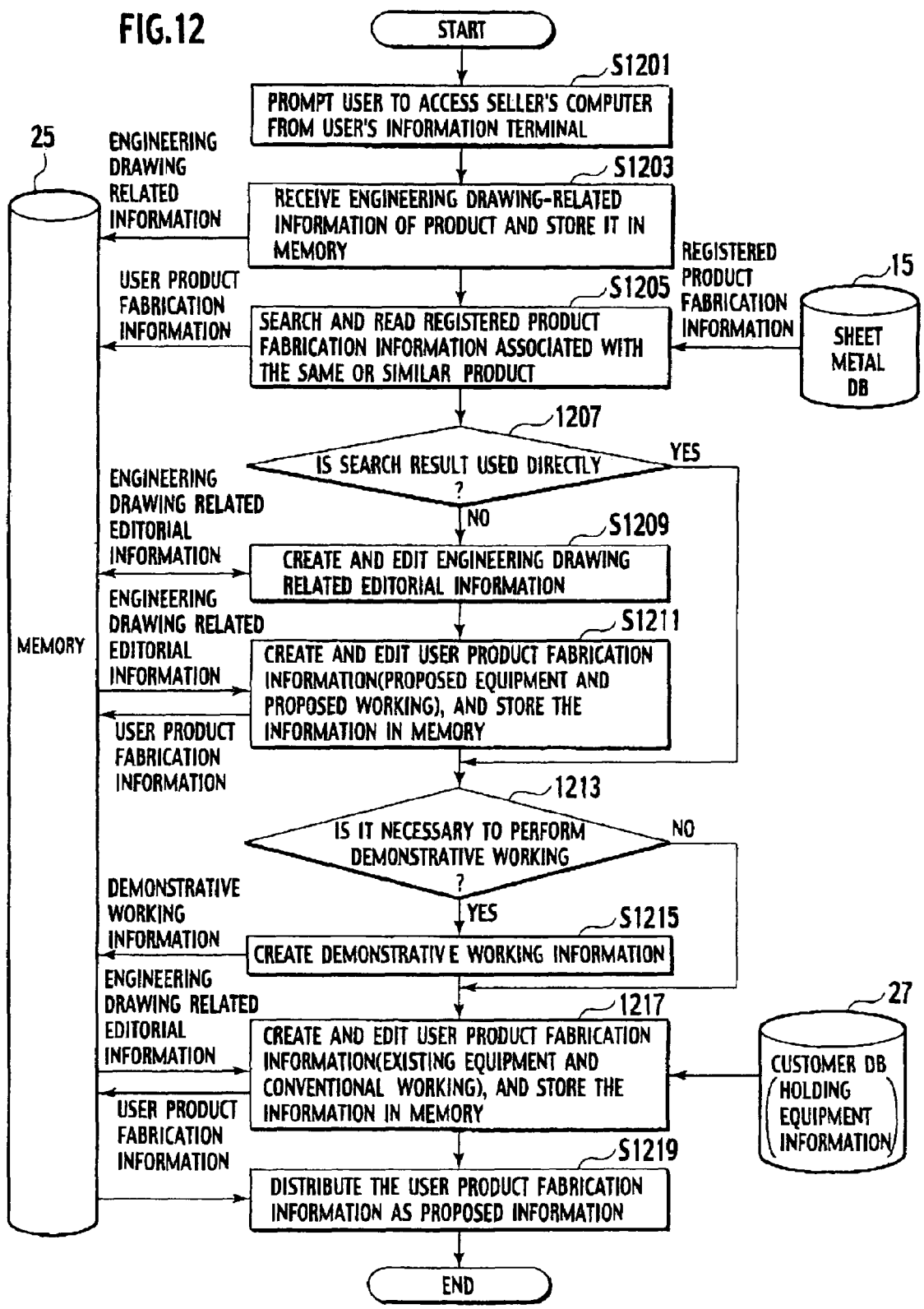
FIG. 12 is a flowchart showing the operation of the sheet metal equipment sales system.

The overall operation of the sheet metal equipment sales system 1 is shown in FIG. 12. At step S1201, the user 3 is prompted to access the seller's computer 11 from the information terminal 7 of the user 3. At step S1203, the editing section 13 included in the seller's computer 11 receives the engineering drawing-related information of the product, to store it in the memory 25 in the seller's computer 11.

At step S1205, the search unit 33 searches and reads the registered product fabrication information associated with the same or similar product from the sheet metal database (database) 15, and then stores the information in the memory 25.

At step S1207, the search unit 33 determines whether to use the search result directly. When it is determined to use the search result directly, control proceeds to step S1213. When it is determined not to use the search result directly, control proceeds to step S1209.

At step S1209, the working edit unit 31 creates and edits engineering drawing-related editorial information. At step S1211, the working edit unit 31 creates and edits the user product fabrication information (proposed equipment and proposed working, or existing equipment and proposed working), and stores the information in the memory 25.

At step S1213, the demonstrative unit 37 determines if the demonstrative working is necessary. When it is determined that the demonstrative working is necessary, control proceeds to step S1215. When it is determined that the demonstrative working is not necessary, control proceeds to step S1217. The case when the demonstrative working is necessary stands for, for example, when the user 3 transmits the instruction data of performing the demonstrative working.

At step S1215, the demonstrative working information creation unit 41 creates the demonstrative working information, and stores it in the memory 25. At step S1217, the user product fabrication information creation unit 35 refers to the customer database (holding equipment information) 27, to create and edit the user product fabrication information (proposed equipment and proposed working, or existing equipment and proposed working), and stores the information in the memory 25.

At step S1219, the communication unit 45 distributes the proposal information (the user product fabrication information and/or the demonstrative working information) created by the proposal information creation unit 43 to the user 3.

For example, at first, when there is an instruction from the user 3, demonstrative working for the user's product is performed by using the production equipment of the user 3 to create the demonstrative working information (information obtained by actual working), and proposal information for proposing a difference between the user product fabrication information (information created by virtual production) by using the proposed equipment of the seller 5 and the demonstrative working information obtained by comparison can be distributed. Further, a difference between virtual production information by the existing equipment of the user 3 and the actual working information by the proposed equipment proposed by the seller 5, or a difference between the actual working information or a difference between the virtual working information by the both equipment is confirmed, and may be used for creating the proposal information to the user 3.

The proposal information in the former case would be a difference between the production information obtained by actual working in the existing equipment of the user 3 and the production information obtained by actual working in the proposed equipment. Alternatively, the proposal information in the former case would be a difference between the production information obtained by virtual working in the existing equipment of the user 3 and the production information obtained by virtual working in the proposed equipment.

Secondly, the seller's computer 11 held by the seller 5 receives the engineering drawing-related information of the product relating to the user 3, and the product fabrication information A created by the user 3, and the user 3 stores the information in the memory 25 (for example, the seller's computer 11 receives the instruction information transmitted by the user 3 and stores it in the memory 25). The seller's computer 11 then searches a product the same as or similar to the product relating to the user 3 from the sheet metal database 15, and reads the registered product fabrication information associated with the same or similar product.

Subsequently, the seller's computer 11 uses the registered product fabrication information and the engineering drawing-related editorial information obtained by editing the engineering drawing-related information to create user product fabrication information B, being the information of a fabrication method by using the proposed equipment proposed by the seller 5 or the user's existing equipment, and stores the information in the memory 25. The difference between the user product fabrication information B and the product fabrication information A created by the user 3 obtained by comparison is proposed to the user 3. Therefore, the problem in the fabrication information that has been heretofore created by the user 3, or the problem in the existing equipment held by the user 3 becomes clear.

Further, demonstrative working may be executed with respect to the introduced equipment actually delivered to the user 3, based on the user product fabrication information (virtual) by using the proposed equipment proposed by the seller 5.

In addition, the demonstrative working executed with respect to the introduced equipment actually delivered to the user 3 may be compared with the information by using the proposed equipment proposed by the seller 5 before the introduced equipment is actually delivered.

Figure 13:
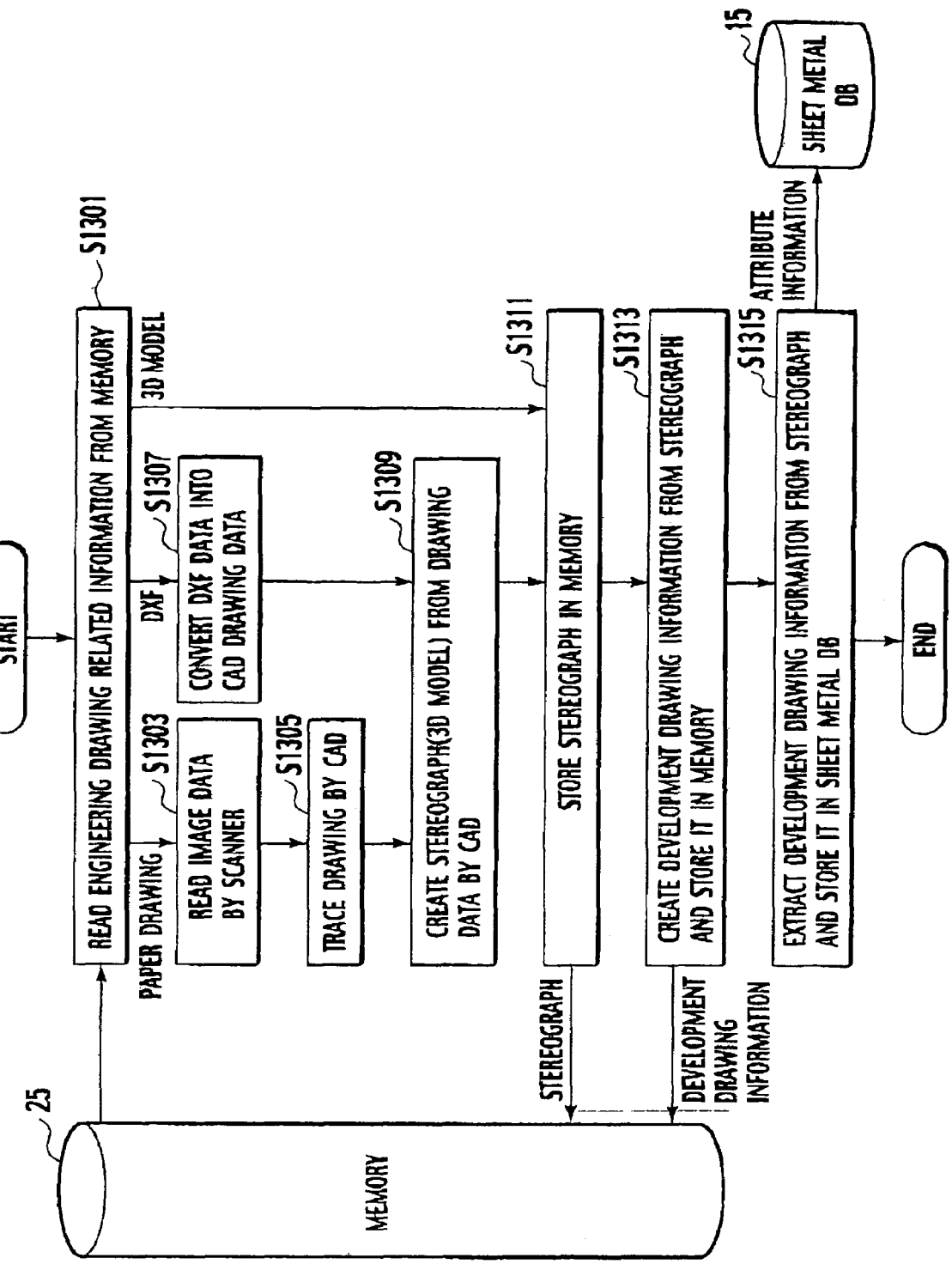
FIG. 13 is a flowchart showing the processing for engineering drawing-related information.

The operation for processing the engineering drawing-related information is explained below, with reference to FIG. 13. At step S1301, the editing section 13 reads the engineering drawing-related information from the memory 25.

At step S1303, in the case of paper drawing, the image data is read by a scanner. Subsequently, at step S1305, the drawing is traced by a CAD.

On the other hand, at step S1307, the DXF data is converted into CAD drawing data. At step S1309, in the case of a CAD drawing, a stereograph (3D model) is created from the CAD drawing data. At step S1311, the stereograph is stored in the memory 25.

At step S1313, the working edit unit 31 creates the development drawing information from the stereograph, and stores it in the memory 25. At step S1315, the working edit unit 31 extracts attribute information (working attribute and the like) from the stereograph, and stores it in the sheet metal database 15.

Figure 14:
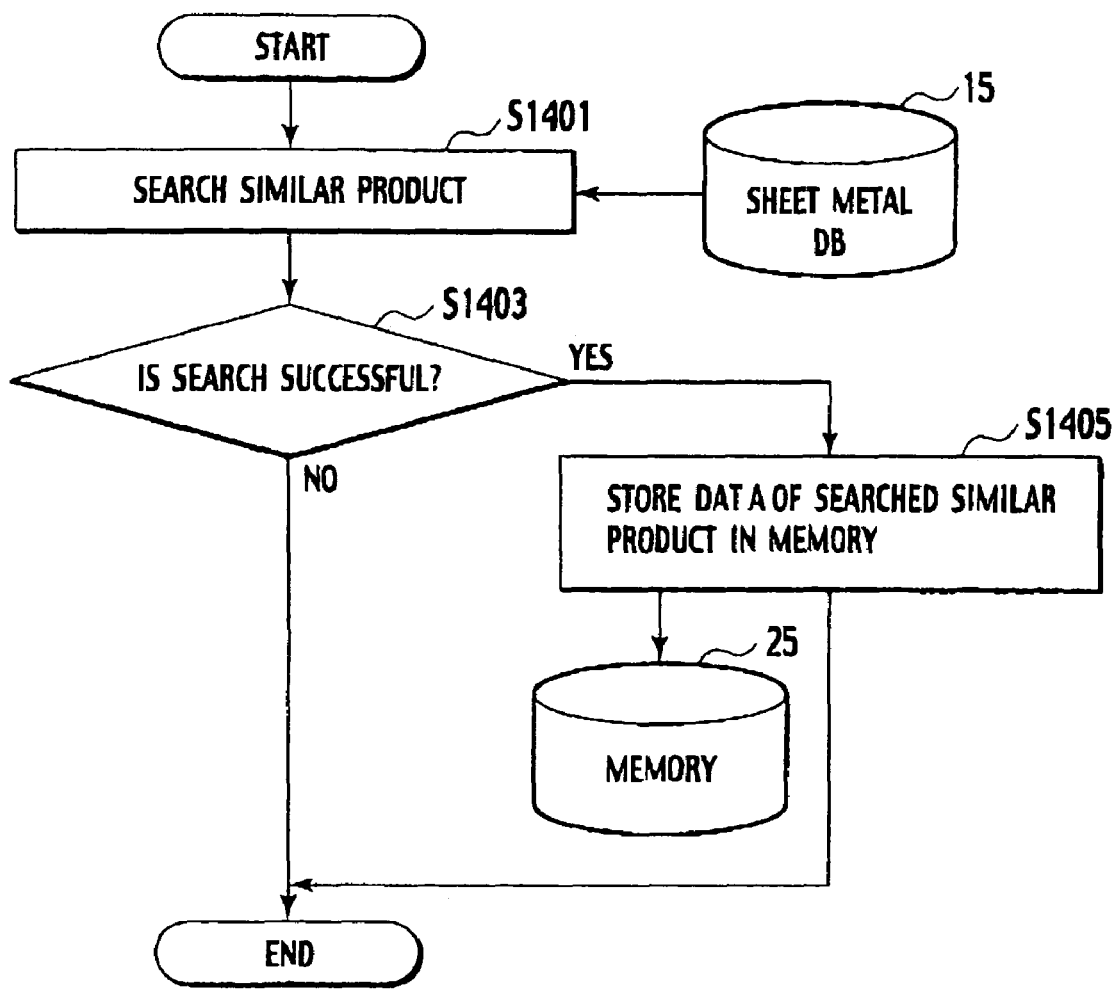
FIG. 14 is a flowchart showing the operation for searching a similar product.

The operation for searching a product the same as or similar to the product of the user 3 is explained below, with reference to FIG. 14. At step S1401, the search unit 33 searches a product the same as or similar to the product of the user 3 from the sheet metal database 15. At step S1403, it is determined if the search is successful. When it is determined that the search is successful, control proceeds to step S1405. When it is determined that the search is not successful, the processing finishes. At step S1405, the search unit 33 stores the data of the searched similar product in the memory 25.

Figure 15:
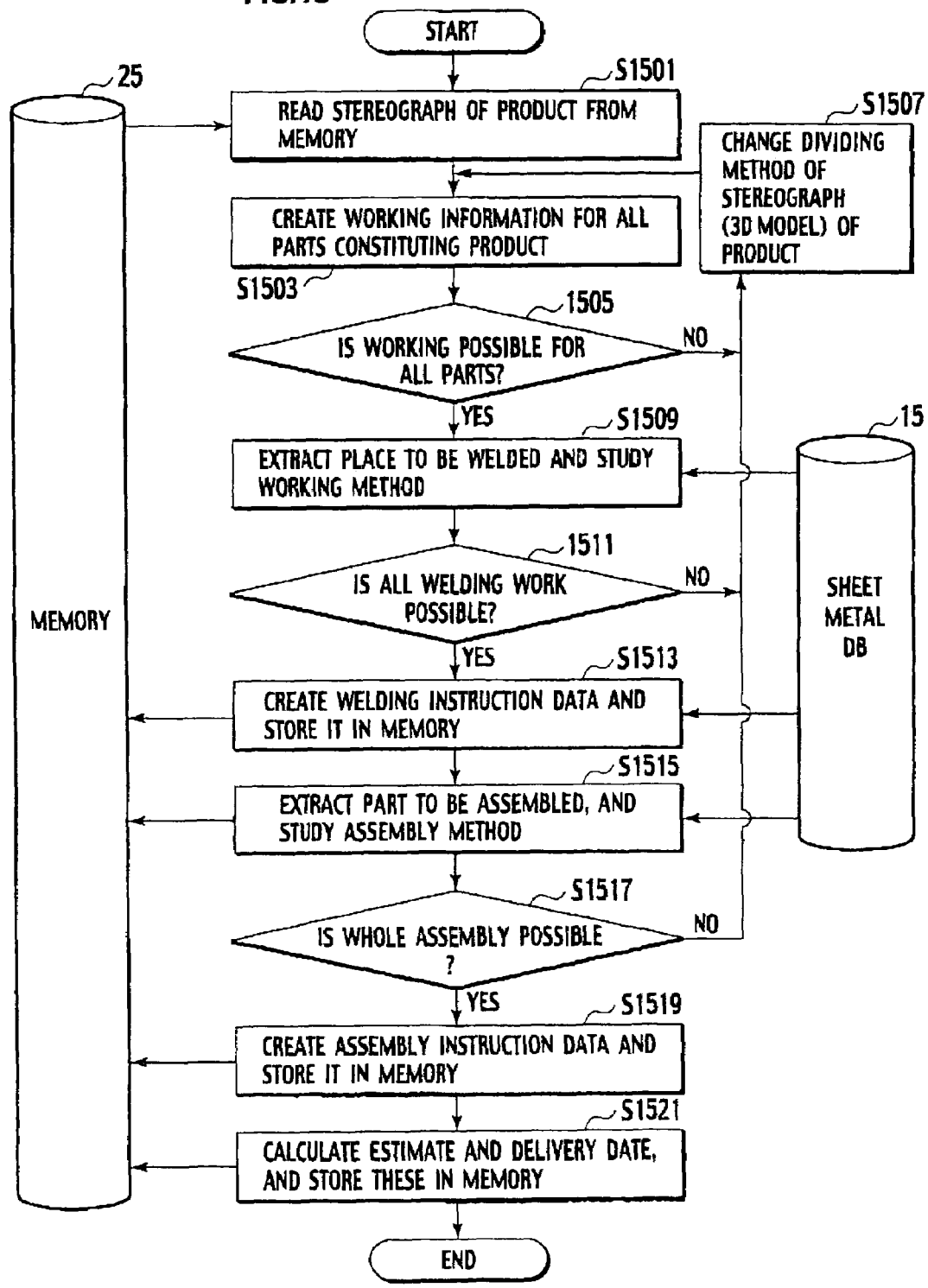
FIG. 15 is a flowchart showing the operation for working edit of a product.

The operation for the working edit unit 31 to perform working edit of the product is explained with reference to FIG. 15. At step S1501, the working edit unit 31 reads the stereograph (3D model) of the product from the memory 25.

At step S1503, the working edit unit 31 creates parts working information for all parts constituting the product. At step S1505, the working edit unit 31 determines whether working is possible for all parts. When it is determined that working is possible for all parts, control proceeds to step S1509. When it is determined that there is a part that cannot be worked, control proceeds to step S1507.

At step S1507, a dividing method of the stereograph (3D model) of the product is changed, and control returns to step S1503. At step S1509, a place to be welded is extracted, to study the working method.

At step S1511, it is determined whether all welding work is possible. When it is determined that all welding work is possible, control proceeds to step S1513. On the other hand, when it is determined that there is a place where welding is not possible, control proceeds to step S1507. At step S1507, the dividing method of the stereograph of the product is changed, and control returns to step S1503.

At step S1513, welding instruction data is created, and stored in the memory 25. At step S1515, a part to be assembled is extracted, to study the assembly method.

At step S1517, it is determined whether whole assembly is possible. When it is determined that the whole assembly is possible, control proceeds to step S1519. When it is determined that there is a part that cannot be assembled, control proceeds to step S1507. At step S1507, the dividing method of the stereograph of the product is changed, and control returns to step S1503.

At step S1519, assembly instruction data is created, and stored in the memory 25. At step S1521, an estimate and delivery date are calculated, and stored in the memory 25.

Figure 16:
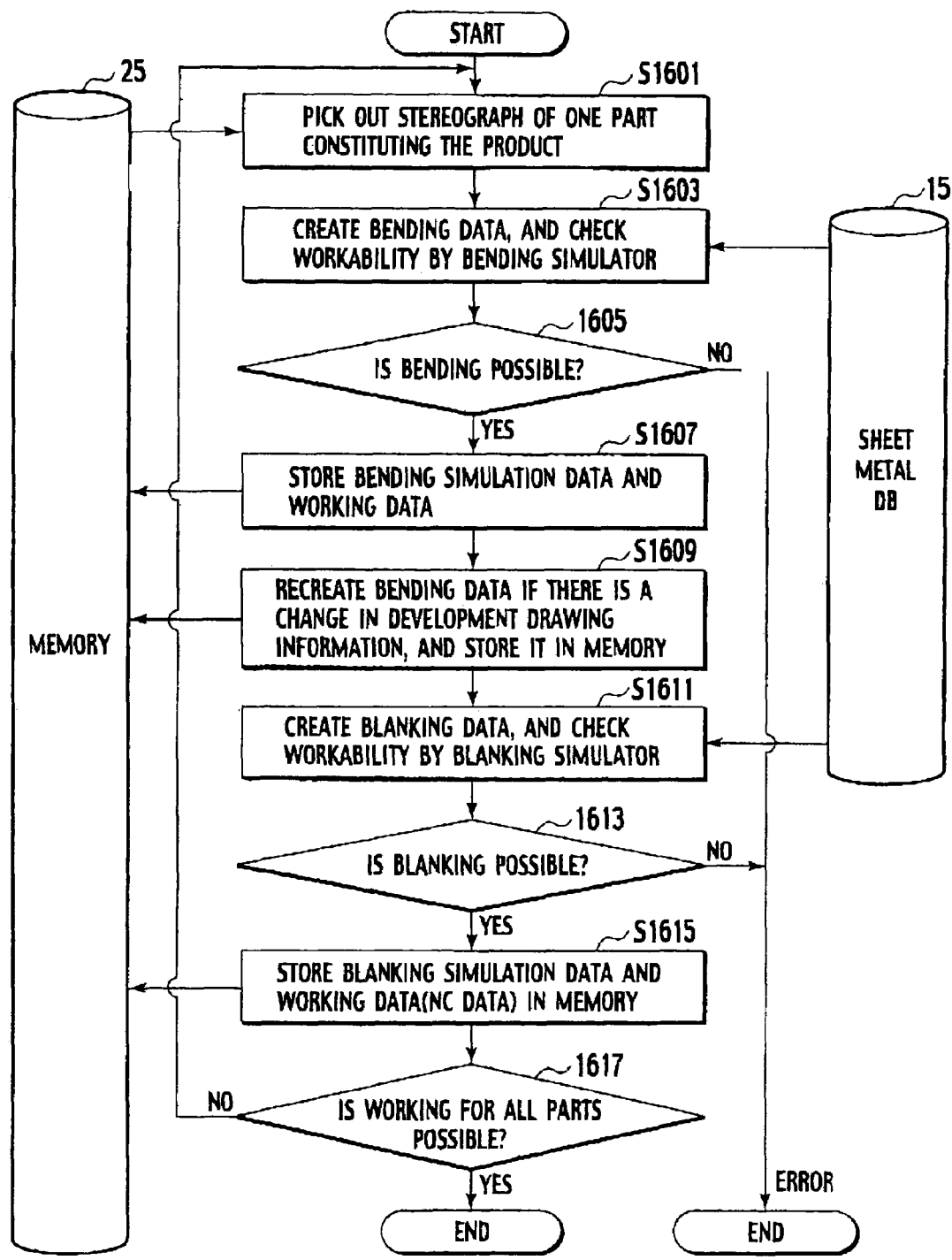
FIG. 16 is a flowchart showing the operation for working edit of the parts.

The operation for the working edit unit 31 to perform working edit of parts is explained below, with reference to FIG. 16. At step S1601, a stereograph of one part constituting the product is picked out.

At step S1603, bending data is created, to check the workability by a bending simulator. At step S1605, it is determined whether bending is possible. When it is determined that bending is possible, control proceeds to step S1607. When it is determined that bending is not possible, it is determined as an error, to finish the processing.

At step S1607, the bending simulation data and working data are stored in the memory 25. At step S1609, if there is a change in the development drawing information, the bending data is recreated, and stored in the memory 25.

At step S1611, blanking data is created, to check the workability by a blanking simulator. At step S1613, it is determined whether blanking is possible. When it is determined that blanking is possible, control proceeds to step S1615. When it is determined that blanking is not possible, it is determined as an error, to finish the processing.

At step S1615, blanking simulation data and working data (NC data) are stored in the memory 25. At step S1617, it is determined if working for all parts is possible. When it is determined that working for all parts is possible, the processing finishes. When it is determined that there is a remaining part, control returns to step S1601, to repeat each processing.

The operation for calculating working time and working cost for the product performed by the working edit unit 31 will be explained below, with reference to FIG. 17. At each step below, the simulation data, the welding instruction data, the painting instruction data, and the assembly instruction data of each working stored in the memory 25 are referred for the calculation of the working time. At the time of calculation of the working time and working cost, a calculation master which becomes a base for calculation, calculation parameters and the like are referred.

At step S1701, bending time is calculated. For example, calculation parameters (for example, a parameter for identifying a working machine that has performed working and the like) are stored in the sheet metal database 15. The logic (for example, a calculating formula for calculating the working time) for calculating the working time is stored in the technology database 29. The database is referred at the time of calculation.

At step S1703, bending cost is calculated. That is, calculation is performed referring to the working time determined at step S1701. At step S1705, the blanking time is calculated. At step S1707, the blanking cost is calculated.

At step S1709, welding time is calculated. At step S1711, welding cost is calculated. At step S1713, the painting time is calculated. At step S1715, the painting cost is calculated.

At step S1717, the assembly time is calculated. At step S1719, the assembly cost is calculated. At step S1721, the delivery date of working is calculated by summing up the working time at each step. At step S1723, the material cost is calculated.

At step S1725, the cost for non-sheet metal parts is calculated. At step S1727, the cost for the special purpose jig is calculated. At step S1729, the total cost is calculated by summing up the working cost, the material cost, the cost for non-sheet metal parts, and the cost for the special purpose jig at each step, and stored in the memory 25.

The operation for demonstrative working performed by the demonstrative unit 37 (including the table control unit 39 and the demonstrative working information creation unit 41) is shown in FIG. 18. At step S1801, actual working of the product is performed in the demonstration factory 19. At step S1803, the actual working image is photographed. The demonstrative working information creation unit 41 edits the image data and stores it in the memory 25.

At step S1805, the actual working is compared with the working simulation data. At step S1807, it is determined whether these agree with each other. When it is determined that these agree with each other, control proceeds to step S1811. When it is determined that these do not agree with each other, control proceeds to step S1809.

At step S1809, the difference between these is stored in the sheet metal database 15. Control then proceeds to step S1811. At step S1811, the actual working time is compared with the working time data. At step S1813, it is determined whether these agree with each other. When it is determined that these agree with each other, control proceeds to step S1817. When it is determined that these do not agree with each other, control proceeds to step S1815.

At step S1815, the difference between these is stored in the sheet metal database 15. At step S1817, the actual working accuracy and quality are compared with the standard master. At step S1819, it is determined whether these agree with each other. When it is determined that these agree with each other, control proceeds to step S1823. When it is determined that these do not agree with each other, control proceeds to step S1821.

At step S1821, the difference between these is stored. At step S1823, the actual working data is stored in the memory 25. At step S1825, it is determined whether all steps have been completed. When it is determined that all steps have been completed, the processing finishes. When it is determined that there is a remaining step, control returns to step S1801, to continue the processing.

At step S1827, it is determined whether all parts have been completed. When it is determined that all parts have been completed, the processing finishes. When it is determined that there is a remaining part, control returns to step S1801, to continue the processing.

The table used for the demonstrative working processing will be explained. The table control unit 39 performs processing relating to the respective tables described below. At first, FIGS. 19A and 19B are referred. The table control unit 39 compares the simulation working data (data for each working machine created at the time of creating the user product fabrication information) with the finally processed working data (after correction), and extracts the difference, to create a working data difference check table TA. In this working data difference check table TA, a changed ID, steps (cutting step, bending step and the like), and a difference between simulation (simulation for virtual production) working data and the actual working data are stored.

The reason why there is a difference between the simulation working data and the actual working data is that at the time of machining the part, there is a certain problem (a problem that cannot be assumed at the time of virtual production by simulation). This problem (for example, the reason of change) and the corrective action therefor are stored in the working change-recording table TB as data. The actually changed part due to the reason of change is associated with the changed ID. The working change recording table TB is stored in the sheet metal database 15 to be used later as an actual example of the working know-how.

Comparison between the actual working time and working time data is explained, with reference to FIG. 19C. A working time check table TC is created, in which the working time (calculated value) by each working machine at each step, calculated based on the working data created by the virtual production by simulation, and the working time measured at the time of actual working (after correction) are stored. The time difference is calculated and stored therein. The working time check table TC is stored in the sheet metal database 15 to be used later as the basic data for reviewing the working time standard master.

Comparison between the actual working accuracy and the standard master is explained, with reference to FIG. 19D. A working accuracy check table TD is created by extracting the dimension of the parts particularly required for the product (measurement points) and a tolerance (important dimension) at the time of creating the user product fabrication information.

The dimension of each part (measurement point) of the product produced by actual working (after correction) is measured, and the result is stored in the working accuracy check table TD. The accuracy is ranked based on a difference between a reference (standard) value (taking tolerance into consideration) and the measurement, and the ranking is stored in the column of level judgment.

The working accuracy check table TD is stored as basic data for updating the standard master (working accuracy) in the sheet metal database 15. The working accuracy check table TD is stored in the sheet metal database 15 as an actual example of working know-how for highly accurate working.

Comparison between the quality of the product and the standard master is explained, with reference to FIG. 19E. For the quality difficult to be judged numerically, the quality is converted into a numerical value, by comparing the image displaying the quality standard and the further note therefor (evaluation point) with the actually worked product.

With regard to a specific quality item, a standard master table by quality item TE describing the link information to the image data expressing the standard and the further note (evaluation point), and the image data are stored in the sheet metal database 15.

The list H of the specific quality items is shown in FIG. 20A. The quality item includes: rough surface (conditions: material, plate thickness, V-width, bending angle, and bending type); crack (conditions: material, plate thickness, V-width, bending angle, bending type, and deviation quantity); section (conditions: material, plate thickness, and cutting condition); dross (conditions: material, plate thickness, and cutting condition); defect (conditions: material, plate thickness, V-width, point R, bending angle, and bending type); R-bending surface (conditions: material, plate thickness, and bending R), bruise (conditions: material, plate thickness, and stamped tonnage); burr (conditions: material, plate thickness, and clearance); nibbling section (conditions: material, plate thickness, working R, punching R, and nibbling pitch); ruptured surface (conditions: material, plate thickness, and clearance); discoloration (conditions: material, plate thickness, and cutting condition); discoloration (conditions: material, plate thickness, and welding condition); and junction (conditions: material, plate thickness, welding condition, and gap).

One example of an evaluation condition table by quality item TF is shown in FIGS. 20B and 20C. As shown in FIG. 20B, the evaluation condition table by quality item TF describing the condition for classifying the quality level (reference level or standard level), and the reference value (reference level) of the quality under the condition, in each quality item, is stored in the sheet metal database 15. Specifically, as shown in FIG. 20C, with respect to rough surface, conditions such as material, plate thickness, V-width, bending angle, and bending type are set. A reference level (standard level) is also set with respect to the product agreeing with these conditions.

The procedure for quality inspection is shown below. A part (check point) agreeing with the conditions for each quality item is extracted based on the user product fabrication information, and the reference level (virtual production level by simulation) of the part is specified, referring to the conditions. The quality check table TH shown in FIG. 20D is for controlling the extracted information.

With respect to each part (check point), the reference level of the actually worked product (actual working level) is input, referring to the standard master table by quality item TE. The reference level of the specified quality item and the actually worked product are compared, and if the reference level is different, the reference level of the actual working is changed to the set reference level (and the difference is recorded).

When the reference level is newly set with respect to a part whose reference level is not displayed, the conditions therefor can be added to the evaluation condition table by quality item, by specifying the part, the quality item, and the reference level. The conditional value at this time is automatically calculated, by specifying the part. The evaluation condition table by quality item is updated by changing or adding the reference level, and stored in the sheet metal database 15.

The operation for creating the proposal information from the information created as described above, and distributing the proposal information will be explained with reference to FIG. 21. At step S2101, a stereograph is picked out from the memory 25. At step S2103, a development drawing information is picked out from the memory 25. At step S2105, the bending simulation data and the working data are picked out from the memory 25.

At step S2107, the actual bending data is picked out from the memory 25. At step S2109, the blanking simulation data and the working data are picked out from the memory 25. At step S2111, the actual blanking data is picked out from the memory 25. At step S2113, the welding instruction data is picked out from the memory 25. At step S2115, the painting instruction data is picked out from the memory 25.

At step S2117, the assembly instruction data is picked out from the memory 25. At step S2119, the estimate and delivery date data (existing equipment and proposed working) is picked out from the memory 25. At step S2121, the estimate and delivery date data (proposed equipment and proposed working) is picked out from the memory 25.

At step S2123, a difference (increased profit) between the profit by the existing equipment and proposed working, and the profit by the proposed equipment and proposed working is extracted. At step S2125, the actual working image is picked out from the memory 25. At step S2127, the proposal information (for example, a proposal) is created by arranging the various types of information picked out from the memory 25.

Figure 22A:
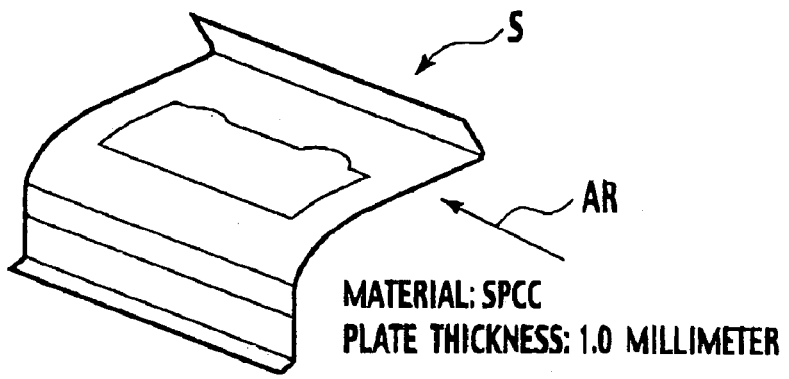
FIGS. 22A to 22C are diagrams for explaining a product.

Control of information obtained by the demonstrative working (table control) will be explained by using a specific part, with reference to FIG. 22. FIG. 22A indicates a part S. The case in which the material is SPCC, and the plate thickness is 1 millimeter is assumed.

Figure 22B:
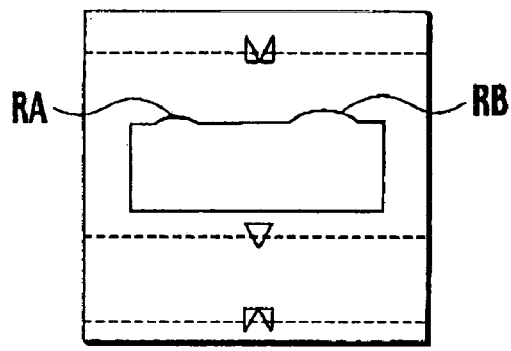
Figure 22C:
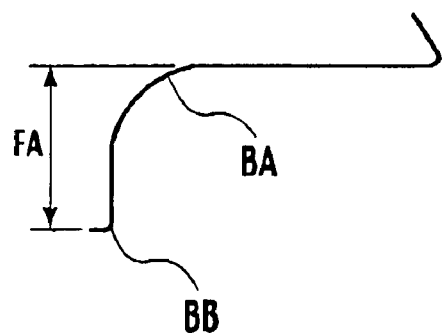

FIG. 22B is a development diagram of the part S. This part comprises a hole having a circular arc RA of R30 and a circular arc RB of R40. FIG. 22C is a side view when the part S is seen from a direction of arrow AR in FIG. 22A. The checkpoint is assumed to be a flange FA, an R-portion BA and a bent portion BB.

Figure 23A:
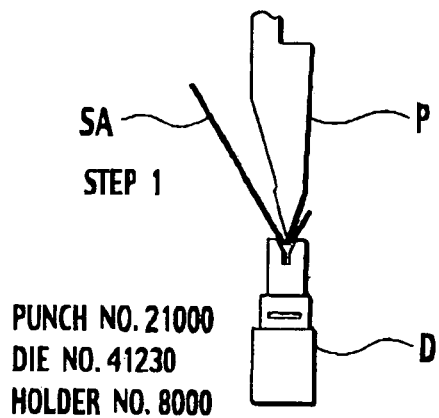
FIGS. 23A to 23C are diagrams for explaining working of a product.
Figure 23B:
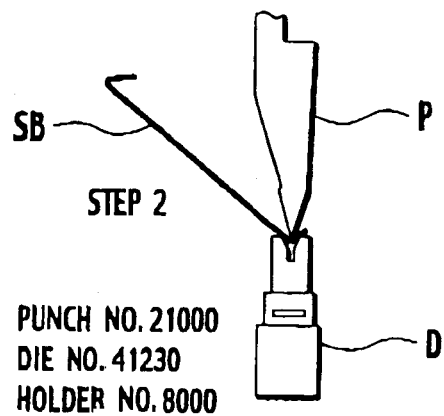
Figure 23C:
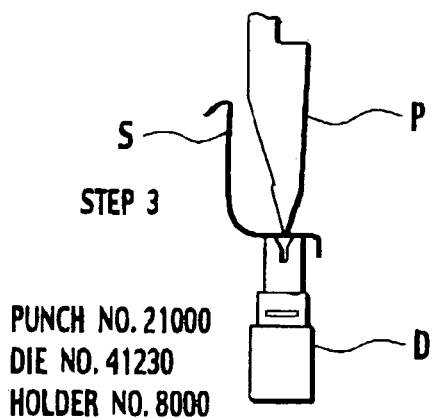

FIG. 23 is referred. As shown in FIG. 23A, at step 1, a half-finished goods SA is produced by bending, using a punch P and a die D. As shown in FIG. 23B, at step 2, a half-finished goods SB is produced by bending, using the punch P and the die D. Subsequently, as shown in FIG. 23C, at step 3, a finished part S is produced by bending (for example, nibbling), using the punch P and the die D. In the above bending, it is assumed to use the same punch P and die D.

Figure 24A:
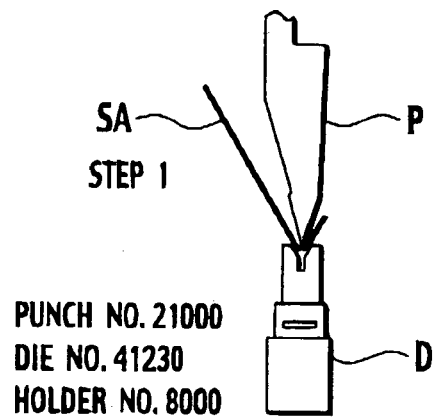
FIGS. 24A to 24C are diagrams for explaining working of a product.
Figure 24B:
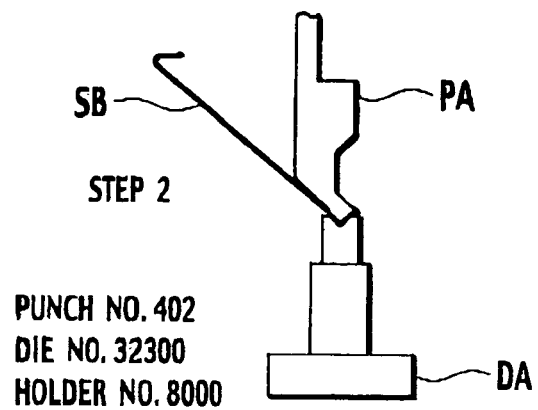
Figure 24C:
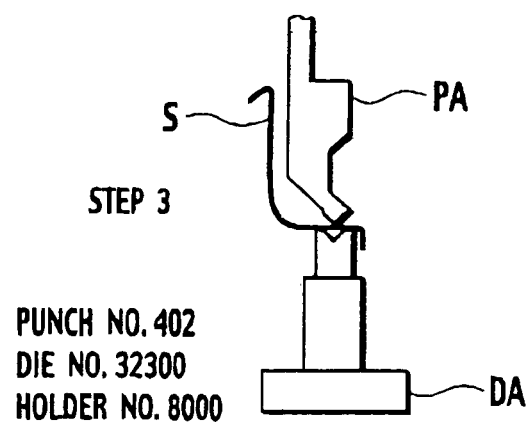

FIG. 24 is referred. Working has been scheduled in the above step, but when the actual working is performed, the accuracy of the bending angle at step 2 is insufficient, and hence the die is changed suddenly. In other words, as shown in FIG. 24A, at step 1, the half-finished goods SA are produced by bending, using the punch P and the die D. As shown in FIG. 24B, at step 2, in order to improve the bending accuracy, a punch PA and a die DA are used to perform bending, to thereby produce the half-finished goods SB. Subsequently, as shown in FIG. 24C, the same mold as that in step 2 is used as the mold in step 3, so that the arrangement is not changed and used for working. The part S is completed by performing bending, using the same punch PA and die DA.

Control of each table resulting from a change in the working step is explained, with reference to FIG. 25. As shown in FIG. 25A, the punch PA changed from the punch P and the die DA changed from the die D at step 2 are stored in the working data difference check table TA, associated with a changed ID 1. Similarly, the punch PA changed from the punch P and the die DA changed from the die D at step 3 are stored in the working data difference check table TA, associated with a changed ID 2.

In a working change-recording table TB, the reason of change (to improve insufficient accuracy in bending angle), and the corrective action (to use a mold having the same angle with the bending angle) are stored, associated with the change ID 1. Further, the reason of change (to decrease arrangement) and the corrective action (to use the same arrangement as the previous step) are stored, associated with the change ID 2.

As shown in FIG. 25B, a calculated value of the working time, the actual measurement, and a difference between these when using a working machine A in the blanking step are stored in a working time check table TC. Further, a calculated value, the actual measurement, and a difference between these at the time of performing the same working by a working machine B are stored therein.

As shown in FIG. 25C, the checkpoint (for example, the flange and the angle) of the product, the reference value (50 for the flange length, and 90 degrees for the angle), tolerance (±0.2 for the flange, and ±30 minutes for the angle), measurement (50.1 for the flange, and 89.4 degrees for the angle), and level judgment (judgment A for the flange, and judgment B for the angle) are stored in the working accuracy check table TD.

A table for controlling the quality is shown in FIG. 26. Checkpoints (in this example, bending R-3, notch R-1, edge-1) of the product S, quality items (R-bending surface, nibbling section, burr), conditions (1, 2, 1), virtual production level (A, A, A), and the actual working level are stored in a quality control check table TG.

In an evaluation condition table by quality item TF, the reference level A agreeing with the burr evaluation—conditions (material: SPCC, plate thickness: 1.0, clearance: 0.1) is selected with respect to the edge-1. The reference level A agreeing with the nibbling section evaluation—conditions (material: SPCC, plate thickness: 1.0, R30, punch diameter: 2, pitch: 1) is selected with respect to the notch R-1. Further, with respect to the bending R-3, the reference level A agreeing with the R-bending surface evaluation—conditions (material: SPCC, plate thickness: 1.0, R30) is selected.

The quality of the product S is then evaluated, referring to the standard master table by quality item. In other words, with respect to the edge-1, the image having the reference level A is evaluated by reading the memory GC (burr: excellent.gif), and referring to the evaluation point (touch). With respect to the notch R-1, the image having the evaluation level A for the nibbling section is evaluated by reading the memory GB (nibbling section: excellent.gif), and referring to the evaluation point (smoothness). Further, with respect to the bending R-3, the image having the reference level A for the R-bending surface in the quality item is evaluated by reading the memory GA (R-bending surface: excellent.gif), and referring to the evaluation point (smoothness).

The present disclosure relates to subject matter contained in Japanese Patent Application Nos. 2002-174730, filed on Jun. 14, 2002, and 2003-396510, filed on Nov. 27, 2003, the contents of both are herein expressly incorporated by reference in their entireties.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. An interactive method for selling sheet metal equipment to a user based on a metal working proposal, using a network, comprising:

interactively communicating with the user through the user's computer by a seller using the seller's computer over the computer network, regarding the user's need to fabricate a metal product and the user's interest in purchasing sheet metal equipment to assist in fabricating the metal product;

receiving, at the seller's computer from the user, engineering drawing-related information relating to the product, and storing the engineering drawing-related information in a memory;

editing the engineering drawing-related information, to generate engineering drawing-related editing information including a 3D model of the product, development information and attribute information;

searching a database for a match for the product, and reading registered product fabrication information for the match for the product;

using the registered product fabrication information and the engineering drawing-related editing information to prepare user product fabrication information relating to a method of producing the product by production equipment, and storing the user product fabrication information in a memory;

demonstrating working of the product by actual equipment to prepare demonstrative working information, based upon the user product fabrication information, in response to an instruction from the user; and distributing one of the user product fabrication information and the demonstrative working information, as proposal information over the network, wherein the proposal information also includes a comparison between a working method using the user's existing production equipment and a working method using the seller's proposed production equipment, wherein the proposal information includes optimum equipment information and profit increase information, and wherein the proposed production equipment includes numerically controlled equipment.

2. The method according to claim 1,
wherein the product fabrication information and the demonstrative working information is accumulated in the database.

3. The method according to claim 1, further comprising:
preparing the demonstrative working information by performing the demonstrative working, when the product is not searched.

4. The method according to claim 1,
wherein the development information, the 3D model information and the attribute information are generated according to a predetermined procedure.

5. The method according to claim 1, further comprising:
logging in, by the seller from the seller's computer, to the computer of the user, to determine a production method of the product by cooperating with the user.

6. The method according to claim 1,
wherein the actual equipment for performing demonstrative working is existing equipment held by the user, or proposed equipment proposed by the seller to the user.

7. An interactive system in which a seller sells sheet metal equipment to a user based on a metal working proposal, using a network, comprising:
a user's computer that permits the user to interactively communicate with the seller using the seller's computer over the network, regarding the user's need to fabricate a metal product and the user's interest in purchasing sheet metal equipment to assist in fabricating the metal product;
a receiver that receives, at the seller's computer from the user, engineering drawing-related information relating to the product, and that stores the engineering drawing-related information in a memory;
an editor that edits the engineering drawing-related information, to generate engineering drawing-related editing information including a 3D model of the product, development information and attribute information;
a searcher that searches a database for a match for the product, and that reads registered product fabrication information for the match for the product;
a product fabrication information preparer that uses the registered product fabrication information and the engineering drawing-related editing information to prepare user product fabrication information relating to a method of producing the product by production equipment, and that stores the user product fabrication information in a memory;
a demonstrator that demonstrates working of the product by actual equipment to prepare demonstrative working information, based on the user product fabrication information, in response to an instruction from the user; and
a distributor that distributes one of the user product fabrication information and the demonstrative working information, as proposal information over the network,
wherein the proposal information also includes a comparison between a working method using the user's existing production equipment and a working method using the seller's proposed production equipment,
wherein the proposal information includes optimum equipment information and profit increase information, and
wherein the proposed production equipment includes numerically controlled equipment.

8. An interactive sheet metal working information proposing method in which a seller proposes sheet metal working information to a user, using a network, comprising:
interactively communicating with the user through the user's computer by the seller using the seller's computer over the computer network, regarding the user's need to fabricate a metal product and the user's interest in purchasing sheet metal equipment to assist in fabricating the metal product;
receiving, at the sellers computer from the user, engineering drawing-related information relating to the product and product fabrication information A prepared by the user, and storing the engineering drawing-related information and the product fabrication information A in a memory;
searching a database for a match for the product, and reading registered product fabrication information associated with the match for the product;
preparing product fabrication information B by production equipment using the registered product fabrication information and engineering drawing-related editing information obtained by editing the engineering drawing-related information, and storing the product fabrication information B in the memory,
proposing a difference, obtained by comparison between the product fabrication information B and the product fabrication information A, and
proposing optimum equipment information and profit increase information for product fabrication information B.
wherein the production equipment for product fabrication information B includes numerically controlled equipment.

9. The method according to claim 8,
wherein the production equipment is existing equipment held by the user, or proposed equipment proposed by the seller.

10. An interactive sheet metal working information proposing system in which a seller proposes sheet metal working information to a user, using a network, comprising:
a user's computer that permits the user to interactively communicate with the seller using the seller's computer over the network, regarding the user's need to fabricate a metal product and the user's interest in purchasing sheet metal equipment to assist in fabricating the metal product;
a receiver that receives, by a computer, from the user, engineering drawing-related information relating to the product and product fabrication information A prepared by the user, and that stores the engineering drawing-related information and the product fabrication information A in a memory;
a computerized searcher that searches a database for a match for the product, and that reads registered product fabrication information associated with the match for the product;
a computer preparing section that prepares product fabrication information B by production equipment using the registered product fabrication information and engineering drawing-related editing information obtained by editing the engineering drawing-related information, and that stores the product information B in the memory; and
a proposing computer that proposes a difference, obtained by comparison between the product fabrication information B and the user product fabrication information A,
wherein the proposer further proposes optimum equipment information and profit increase information for product fabrication information B, and
wherein the production equipment for product fabrication information B includes numerically controlled equipment.

11. The sheet metal working information proposing system according to claim 10,
wherein the production equipment is existing equipment held by the user, or proposed equipment proposed by the seller.

* * * * *